(12) United States Patent
Wang et al.

(10) Patent No.: US 12,270,340 B2
(45) Date of Patent: Apr. 8, 2025

(54) GAS TURBINE ENGINE AND FUEL CELL ASSEMBLY

(71) Applicant: General Electric Company, Schenectady, NY (US)

(72) Inventors: Honggang Wang, Clifton Park, NY (US); Brandon Wayne Miller, Liberty Township, OH (US); Michael Anthony Benjamin, Cincinnati, OH (US); Richard L. Hart, Broadalbin, NY (US); Randy M. Vondrell, Cincinnati, OH (US); Ryan St. Pierre, Jacksonville, FL (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/404,364

(22) Filed: Jan. 4, 2024

(65) Prior Publication Data

US 2024/0287936 A1 Aug. 29, 2024

(30) Foreign Application Priority Data

Feb. 23, 2023 (CN) .................. 202310155818.X

(51) Int. Cl.
*F02C 7/22* (2006.01)
*H01M 8/04089* (2016.01)
(Continued)

(52) U.S. Cl.
CPC ........... *F02C 7/22* (2013.01); *H01M 8/04097* (2013.01); *H01M 8/04111* (2013.01); *H01M 8/0618* (2013.01)

(58) Field of Classification Search
CPC ..... H01M 2250/20; H01M 2008/1293; H01M 8/04111; H01M 8/04738; H01M 8/04776;
(Continued)

(56) References Cited

U.S. PATENT DOCUMENTS

| 3,658,279 A | 4/1972 | Robertson |
| 3,805,517 A | 4/1974 | Sewell et al. |

(Continued)

FOREIGN PATENT DOCUMENTS

| CN | 106976405 A | 7/2017 |
| DE | 102005012230 A1 | 10/2005 |

(Continued)

OTHER PUBLICATIONS

Acampora et al., Continuation Analysis of Complex Chemical Mechanisms for Jet-Fuels Combustion in PSR, Aug. 2-7, 2015, 6 Pages. http://www.icders.org/ICDERS2015/abstracts/ICDERS2015-298.pdf.

(Continued)

*Primary Examiner* — Craig Kim
(74) *Attorney, Agent, or Firm* — Dority & Manning, P.A.

(57) ABSTRACT

A gas turbine engine is provided. The gas turbine engine includes a turbomachine having a compressor section, a combustor, and a turbine section arranged in serial flow order, the turbomachine further including an outer casing and, during operation of the gas turbine engine, an exhaust gas flow from the turbine section; and a fuel cell assembly positioned within the outer casing of the turbomachine, the fuel cell assembly having a fuel cell defining an inlet positioned to receive a portion of the exhaust gas flow, an outlet positioned to provide output products directly to the exhaust gas flow, or both.

20 Claims, 20 Drawing Sheets

(51) Int. Cl.
*H01M 8/04111* (2016.01)
*H01M 8/0612* (2016.01)

(58) Field of Classification Search
CPC ............ H01M 8/04992; H01M 8/0494; B64D 2041/005; B64D 27/10; B64D 27/026; F02C 9/00; F02C 7/22; F02C 3/20
See application file for complete search history.

(56) References Cited

U.S. PATENT DOCUMENTS

| | | |
|---|---|---|
| 4,684,081 A | 8/1987 | Cronin |
| 5,227,256 A | 7/1993 | Marianowski et al. |
| 5,366,819 A | 11/1994 | Hartvigsen et al. |
| 5,449,568 A | 9/1995 | Micheli et al. |
| 5,541,014 A | 7/1996 | Micheli et al. |
| 5,573,867 A | 11/1996 | Zafred et al. |
| 5,581,995 A | 12/1996 | Lucenko et al. |
| 5,858,314 A | 1/1999 | Hsu et al. |
| 5,968,680 A | 10/1999 | Wolfe et al. |
| 6,183,703 B1 | 2/2001 | Hsu et al. |
| 6,296,957 B1 | 10/2001 | Graage |
| 6,348,278 B1 | 2/2002 | LaPierre et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,118,818 B2 | 10/2006 | Agnew et al. |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,767,359 B2 | 8/2010 | Hoffjann et al. |
| 7,781,115 B2 | 8/2010 | Lundberg |
| 7,818,969 B1 | 10/2010 | Hotto |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,882,865 B2 | 11/2014 | Johnston |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,086,222 B2 | 10/2018 | Tichborne et al. |
| 10,224,556 B2 | 3/2019 | Lents et al. |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 * | 5/2020 | Stoia ................ H01M 8/04111 |
| 10,671,092 B2 | 6/2020 | DiRusso et al. |
| 10,676,208 B2 | 6/2020 | Wangemann et al. |
| 10,724,432 B2 * | 7/2020 | Shapiro ............... H01M 8/2428 |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,800,525 B2 | 10/2020 | Sankrithi et al. |
| 10,814,992 B2 | 10/2020 | Halsey et al. |
| 10,913,543 B2 | 2/2021 | Bailey et al. |
| 10,914,233 B2 | 2/2021 | Manabe et al. |
| 10,919,635 B2 | 2/2021 | Edgar et al. |
| 10,950,875 B1 | 3/2021 | Radhakrishnan et al. |
| 10,967,984 B2 | 4/2021 | Willford et al. |
| 10,978,723 B2 | 4/2021 | Lo et al. |
| 11,719,441 B2 * | 8/2023 | Wang ....................... F23R 3/286 60/39.23 |
| 11,753,179 B2 * | 9/2023 | Wickersham ............. F02K 7/10 60/204 |
| 11,794,912 B2 * | 10/2023 | Wang ........................ F02C 3/20 |
| 11,804,607 B2 * | 10/2023 | Wang .................... B64D 31/00 |
| 11,923,586 B1 * | 3/2024 | Hong ..................... H01M 8/10 |
| 11,933,216 B2 * | 3/2024 | Wang ....................... F02C 9/28 |
| 11,967,743 B2 * | 4/2024 | Wang ..................... B60L 58/30 |
| 11,970,282 B2 * | 4/2024 | Wang ..................... B64D 27/10 |
| 2002/0163819 A1 | 11/2002 | Treece |
| 2004/0081871 A1 | 4/2004 | Kearl et al. |
| 2004/0150366 A1 | 8/2004 | Ferrall et al. |
| 2005/0144961 A1 | 7/2005 | Colibaba-Evulet et al. |
| 2006/0010866 A1 | 1/2006 | Rehg et al. |
| 2008/0155984 A1 | 7/2008 | Liu et al. |
| 2010/0133475 A1 | 6/2010 | Kobayashi et al. |
| 2010/0159303 A1 | 6/2010 | Rock et al. |
| 2011/0071707 A1 | 3/2011 | Crumm et al. |
| 2012/0094202 A1 | 4/2012 | Rethore |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0255733 A1 | 9/2014 | Masset et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0141675 A1 | 5/2018 | Halsey et al. |
| 2018/0166734 A1 | 6/2018 | Linde et al. |
| 2018/0319283 A1 | 11/2018 | Battin et al. |
| 2019/0121369 A1 | 4/2019 | DiRusso et al. |
| 2019/0136761 A1 | 5/2019 | Shapiro et al. |
| 2019/0145273 A1 | 5/2019 | Frank et al. |
| 2020/0014044 A1 | 1/2020 | Tichy et al. |
| 2020/0062414 A1 | 2/2020 | Hon et al. |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0313207 A1 | 10/2020 | Milcarek et al. |
| 2021/0003281 A1 | 1/2021 | Amble et al. |
| 2021/0075034 A1 | 3/2021 | Irie et al. |
| 2021/0098803 A1 * | 4/2021 | Kajio ..................... B01D 45/08 |
| 2021/0115857 A1 | 4/2021 | Collopy |
| 2021/0340884 A1 | 11/2021 | Macdonald et al. |

(56) References Cited

U.S. PATENT DOCUMENTS

| 2022/0297844 | A1* | 9/2022 | Mackin | B64D 27/24 |
|---|---|---|---|---|
| 2022/0356848 | A1 | 11/2022 | Joshi et al. | |
| 2023/0238552 | A1* | 7/2023 | Wang | H01M 8/04268 |
| 2023/0290967 | A1* | 9/2023 | Wang | H01M 4/8652 |
| 2024/0170692 | A1* | 5/2024 | Chen | H10N 10/13 |

FOREIGN PATENT DOCUMENTS

| EP | 3805107 | A1 | | 4/2021 | | |
|---|---|---|---|---|---|---|
| JP | 2009187756 | A | | 8/2009 | | |
| JP | 2011002308 | A | | 1/2011 | | |
| JP | 2018087501 | A | | 6/2018 | | |
| KR | 20090064853 | A | | 6/2009 | | |
| WO | WO2018108962 | A1 | | 6/2018 | | |
| WO | WO2020/011380 | A1 | | 1/2020 | | |
| WO | WO-2021129430 | A1 | * | 7/2021 | | F01B 1/08 |

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5e1a00b517423bb51a81713ca211b68&me=true&node=pt14.133&rgn=div5#se14.1.33_175.

Edwards, "Kerosene" Fuels for Aerospace Propulsion—Composition and Properties, AIAA 2002-3874, 38th AIAA/ASME/SAE/ASEE Joint Propulsion Conference & Exhibit, Indianapolis, Indiana, Jul. 7-10, 2002. (Abstract Only) https://www.researchgate.net/publication/268481032_Kerosene_Fuels_for_Aerospace_Propulsion_-_Composition_and_Properties https://arc.aiaa.org/doi/abs/10.2514/6.2002-3874.

Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.

Korczewski, Exhaust Gas Temperature Measurements in Diagnostic Examination of Naval Gas Turbine Engines, Part I Steady-State Processes, Polish Maritime Research, 2(69), vol. 18, 2011, pp. 37-43. https://sciendo.com/pdf/10.32478/v10012-011-0010-2.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.energy.gov/sites/prod/files/2014/03/f9/sofc_for_aircraft_pnnl_2012.pdf.

* cited by examiner

# GAS TURBINE ENGINE AND FUEL CELL ASSEMBLY

PRIORITY INFORMATION

The present application claims priority to Chinese Patent Application Serial Number 202310155818.X filed on Feb. 23, 2023.

FIELD

The present disclosure relates to a fuel cell assembly, a gas turbine engine having a fuel cell assembly integrated therein, and methods of operating the same.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

At least certain gas turbine engines include a fuel cell assembly operable therewith.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
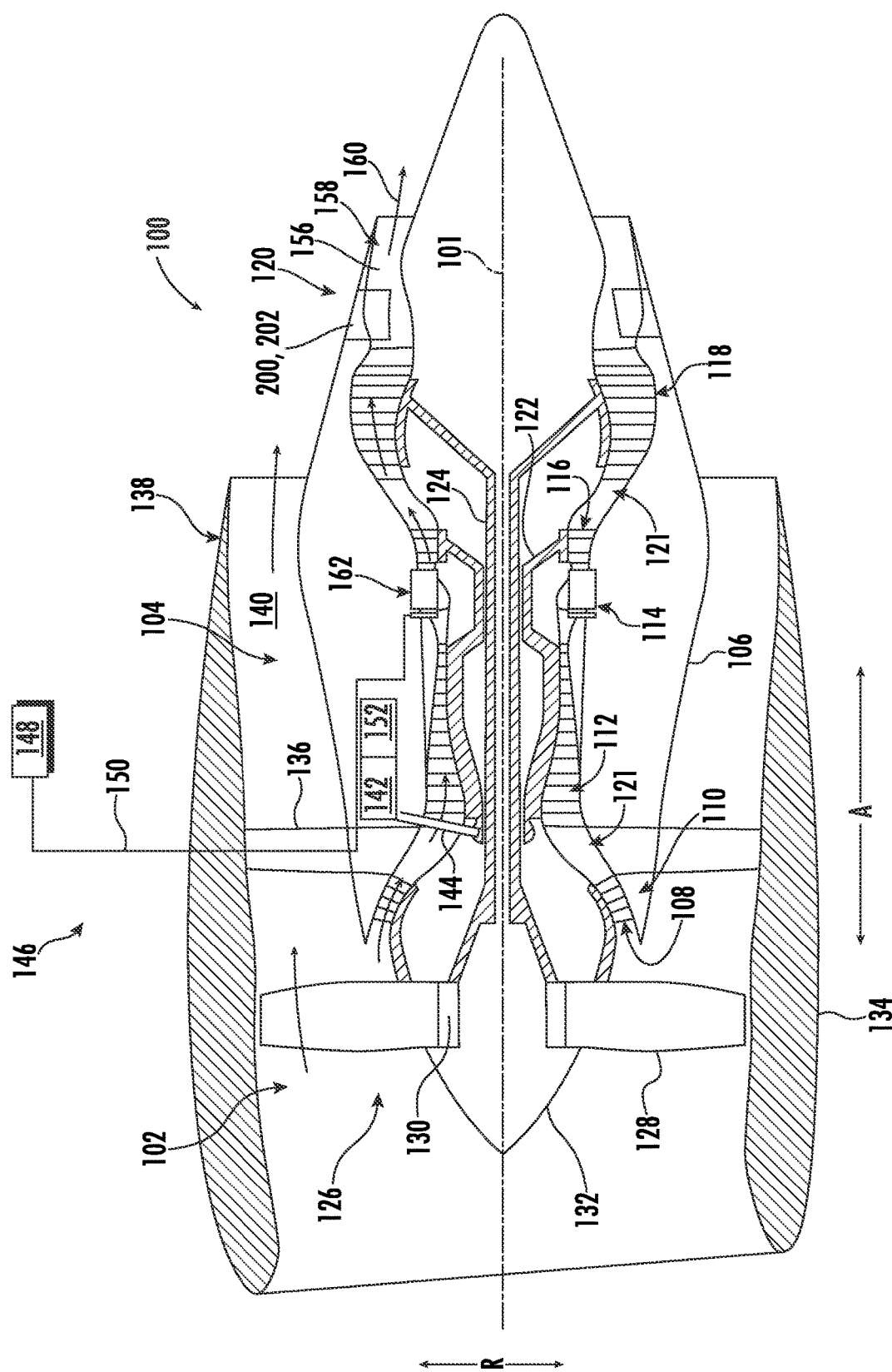
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

As will be discussed in more detail below, fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems. To improve system efficiency and fuel utilization and reduce external water usage, the fuel cell system may include an anode recirculation loop. As a single fuel cell can only generate about 1V voltage, a plurality of fuel cells may be stacked together (which may be referred to as a fuel cell stack) to generate a desired voltage. Fuel cells may include Solid Oxide Fuel Cells (SOFC), Molten Carbonate Fuel Cells (MCFC), Phosphoric Acid Fuel Cells (PAFC), and Proton Exchange Membrane Fuel Cells (PEMFC), all generally named after their respective electrolytes. Each of these fuel cells may have specific benefits in the form of a preferred operating temperature range, power generation capability, efficiency, etc.

In particular, it will be appreciated that a SOFC is generally an electrochemical conversion device that produces electricity directly from oxidizing a fuel. The SOFC's of the present disclosure may generally include a solid oxide or ceramic electrolyte. This class of fuel cells generally exhibit high combined heat and power efficiency, long-term stability, fuel flexibility, and low emissions.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is a gas turbine engine 100, which is more specifically configured as a high bypass turbofan engine. As shown in FIG. 1, the gas turbine engine defines an axial direction A (extending parallel to a centerline axis 101 provided for reference), a radial direction R, and a circumferential direction (extending about the axial direction A; not depicted in FIG. 1). In general, the gas turbine engine includes a rotor assembly 102 and a turbomachine 104 disposed downstream from the rotor assembly 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet nozzle exhaust section 120. The compressor section, combustion section 114, and turbine section together define at least in part a working gas flowpath 121 extending from the annular inlet 108 to the jet nozzle exhaust section 120. The turbofan engine further includes one or more drive shafts. More specifically, the turbofan engine includes a high pressure (HP) shaft 122 drivingly connecting the HP turbine 116 to the HP compressor 112, and a low pressure (LP) shaft 124 drivingly connecting the LP turbine 118 to the LP compressor 110.

For the embodiment depicted, the rotor assembly 102 includes a fan 126 having a plurality of fan blades 128 coupled to a disk 130 in a spaced apart manner. The plurality of fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The outer nacelle 134 is supported relative to the turbomachine 104 by a plurality of circumferentially-spaced outlet guide vanes 136. A downstream section 138 of the outer nacelle 134 extends over an outer portion of the turbomachine 104 so as to define a bypass airflow passage 140 therebetween.

In such a manner, it will be appreciated that gas turbine engine generally includes a first stream (e.g., working gas flowpath 121) and a second stream (e.g., bypass airflow passage 140) extending parallel to the first stream. In certain exemplary embodiments, the gas turbine engine may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the gas turbine engine additionally includes an accessory gearbox 142 and a fuel delivery system 146. The fuel delivery system 146 may be an aircraft fuel supply, such as an aircraft fuel supply for a propulsion system for an aircraft. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the gas turbine engine 100 during at least certain operations, and may further provide power back to the gas turbine engine 100 during other operations. For example, the accessory gearbox 142 is, for the embodiment depicted, coupled to a starter motor/generator 152. The starter motor/generator may be configured to extract power from the accessory gearbox 142 and gas turbine engine 100 during certain operation to generate electrical power, and may provide power back to the accessory gearbox 142 and gas turbine engine 100 (e.g., to the HP shaft 122) during other operations to add mechanical work back to the gas turbine engine 100 (e.g., for starting the gas turbine engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the gas turbine engine 100. More specifically, the one or more fuel delivery lines 150 provide a fuel flow through the fuel delivery system 146 to a primary fuel nozzle of the combustion section 114 of the turbomachine 104.

As noted above, the gas turbine engine includes a jet nozzle exhaust section 120. More specifically, the turbomachine 104 includes an exhaust nozzle 156 located downstream of the turbine section (i.e., downstream of the HP turbine 116 and LP turbine 118 in the embodiment depicted). The exhaust nozzle 156 defines as exhaust gas flowpath 158, through which an exhaust gas flow 160 is directed during operation of the gas turbine engine 100. In addition, as will be described in more detail below, for the embodiment depicted, the gas turbine engine 100 further includes a fuel cell assembly 200 positioned within the outer casing 106 of the turbomachine 104. The fuel cell assembly 200 includes a fuel cell 202 (not separately depicted) positioned aft of a combustor 162 of the combustion section 114. In such a manner, as will be described in more detail below, the fuel cell 202 of the fuel cell assembly 200 may be fluidly coupled, thermally coupled, or both to the exhaust gas flowpath 158 during operation of the gas turbine engine 100.

It will be appreciated, however, that the exemplary gas turbine engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine 100 depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary gas turbine engine 100 includes a ducted fan 126, in other exemplary aspects, the gas turbine engine may include an unducted fan 126 (or open rotor fan), without the outer nacelle 134. Further, although not depicted herein, in other embodiments the gas turbine engine may be any other suitable type of gas turbine engine, such as a nautical gas turbine engine.

Figure 2:
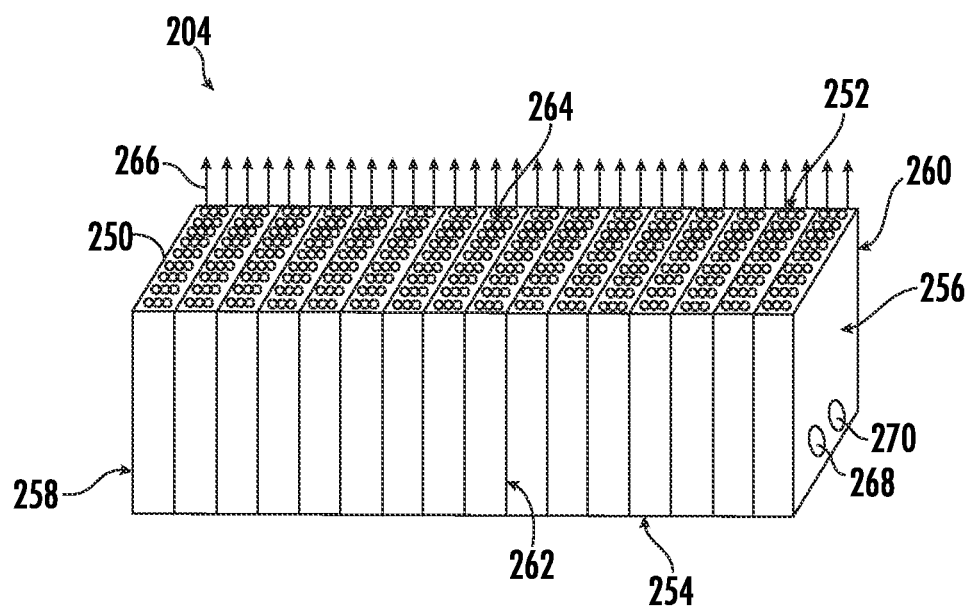
FIG. 2 is a schematic view of a fuel cell stack of a fuel cell assembly in accordance with an exemplary aspect of the present disclosure.

Moreover, referring now to FIG. 2, a schematic illustration is provided as an isometric view of a fuel cell stack 204 of the fuel cell assembly 200 of FIG. 1, including the fuel cell 202 (not separately labeled) of the fuel cell assembly 200 of FIG. 1. The fuel cell stack 204 depicted includes a housing 250 having a combustion outlet side 252 and a side 254 that is opposite to the combustion outlet side 252, a fuel and air inlet side 256 and a side 258 that is opposite to the fuel and air inlet side 256, and sides 260, 262. The side 260, the side 258, and the side 254 are not visible in the isometric view of FIG. 2.

As will be appreciated, the fuel cell stack 204 includes a plurality of fuel cells that are "stacked," e.g., side-by-side from one end of the fuel cell stack 204 (e.g., fuel and air inlet side 256) to another end of the fuel cell stack 204 (e.g., side 258). As such, it will further be appreciated that the combustion outlet side 252 includes a plurality of combustion outlets 264, each from a fuel cell 202 of the fuel cell stack 204. During operation, combustion gas 266 (also referred to herein as "output products") is directed from the combustion outlets 264 out of the housing 250. As described herein, the combustion gas 266 is generated using fuel and air that is not consumed by the fuel cells inside the housing 250 of the fuel cell stack 204. The combustion gas 266 is provided to one or more locations, as described hereinbelow.

The fuel and air inlet side 256 includes one or more fuel inlets 268 and one or more air inlets 270. Optionally, one or more of the inlets 268, 270 can be on another side of the housing 250. Each of the one or more fuel inlets 268 is fluidly coupled with a source of fuel for the fuel cell stack 204, such as one or more pressurized containers of a hydrogen-containing gas or a fuel processing unit or an aviation fuel source. Each of the one or more air inlets 270 is fluidly coupled with a source of air for the fuel cells, such as air that is discharged from a compressor section and/or an air processing unit, or air from an exhaust gas flow 160 (FIG. 1), as is also described further below. The one or more inlets 268, 270 separately receive the fuel and air from the external sources of fuel and air, and separately direct the fuel and air into the fuel cells.

In certain exemplary embodiments, the fuel cell stack 204 of FIG. 2 may be configured in a similar manner to one or more of the exemplary fuel cell systems (labeled 100) described in, e.g., U.S. Patent Application Publication No. 2020/0194799 A1, filed Dec. 17, 2018, that is incorporated by reference herein in its entirety.

Figure 3:
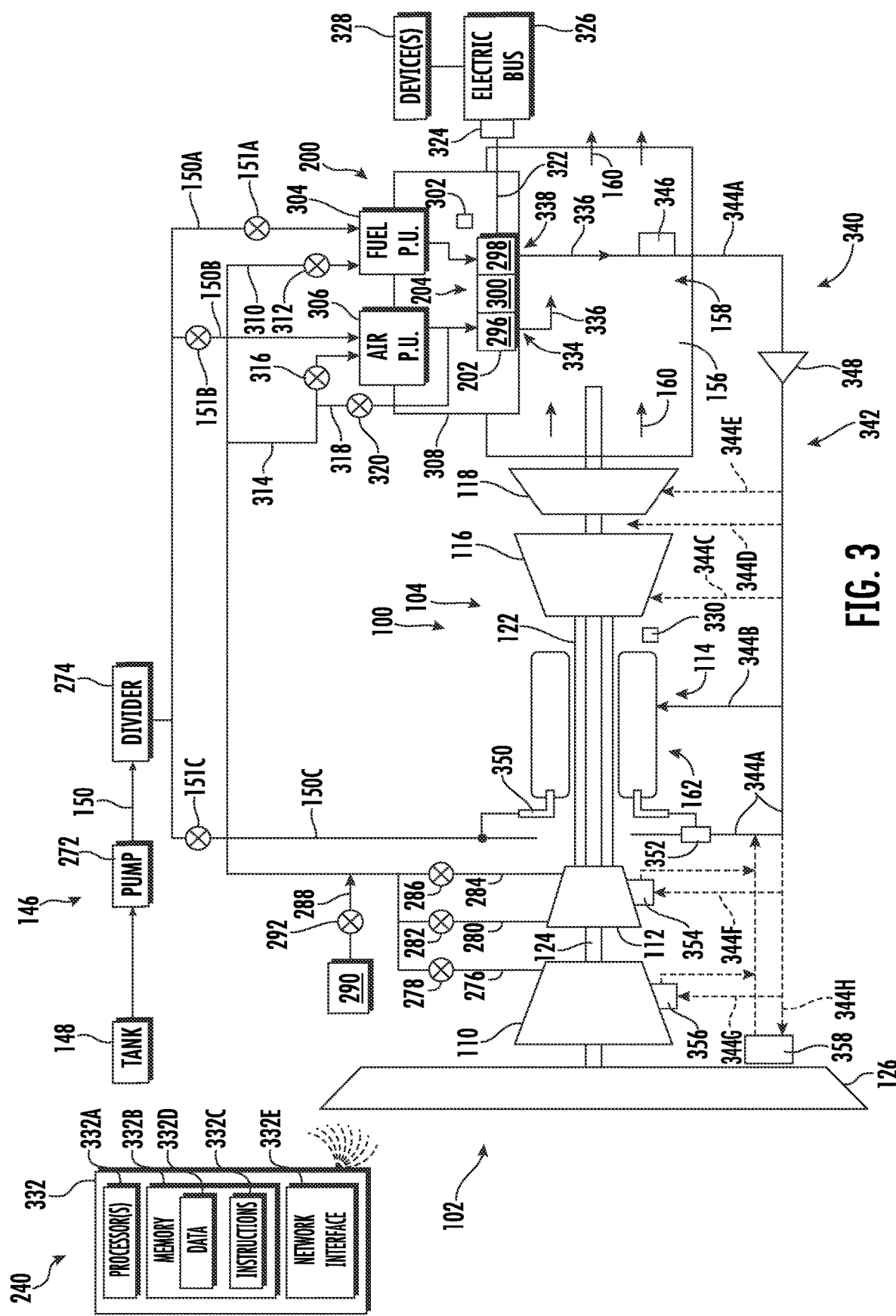
FIG. 3 is a schematic diagram of a gas turbine engine including a fuel cell assembly in accordance with an exemplary aspect of the present disclosure.

Referring now to FIG. 3, operation of a fuel cell assembly 200 in accordance with an exemplary embodiment of the present disclosure will be described. More specifically, FIG. 3 provides a schematic illustration of a gas turbine engine 100 and a fuel cell assembly 200 according to an embodiment of the present disclosure. The gas turbine engine 100 and fuel cell assembly 200 may, in certain exemplary embodiments, be configured in a similar manner as one or more of the exemplary embodiments of FIGS. 1 and 2.

Accordingly, it will be appreciated that the gas turbine engine 100 generally includes a rotor assembly 102 having a fan 126, an LP compressor 110, an HP compressor 112, a combustion section 114, an HP turbine 116, and an LP turbine 118. The combustion section 114 generally includes a combustor 162.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel line 150A, a second fuel line 150B, and a third fuel line 150C. The flow divider 274 divides the fuel flow from the fuel source 148 and fuel pump 272 into a first fuel flow through the first fuel line 150A to the fuel cell assembly 200, a second fuel flow through the second fuel line 150B also to the fuel cell assembly 200 (and in particular to an air processing unit, described below), and a third fuel flow through a third fuel line 150C to the combustor 162. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel line 150A (e.g., for controlling the first fuel flow), a second fuel valve 151B associated with the second fuel line 150B (e.g., for controlling the second fuel flow), and a third fuel valve 151C associated with the third fuel line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cells 202 of the fuel cell assembly 200. The airflow supply may be, e.g., a second gas turbine engine 100 configured to provide a cross-bleed air, an auxiliary power unit (APU) configured to provide a bleed air, a ram air turbine (RAT), an ambient location (e.g., a freestream air), etc. The airflow supply may be complimentary to the compressor bleed system if the compressor air source is inadequate or unavailable.

The compressor bleed system (and air stream supply duct 288) is in airflow communication with the airflow delivery system for providing compressed airflow to the fuel cell assembly 200, as will be explained in more detail below.

Referring still to FIG. 3, the fuel cell assembly 200 includes a fuel cell stack 204, which may be configured in a similar manner as, e.g., the fuel cell stack 204 (FIG. 2) described above. The fuel cell stack 204 is depicted schematically as a single fuel cell 202 having a cathode side 296 (also referred to herein as "cathode 296"), an anode side 298 (also referred to herein as "anode 298"), and an electrolyte 300 (also referred to as an electrolyte layer) positioned therebetween. As will generally be appreciated, the electrolyte 300 may, during operation, conduct negative oxygen ions from the cathode side 296 to the anode side 298 to generate an electric current and electric power.

Briefly, it will be appreciated that the fuel cell assembly 200 further includes a fuel cell sensor 302 configured to sense data indicative of a fuel cell assembly 200 operating parameter, such as a temperature of the fuel cell stack 204 (e.g., of the cathode side 296 or anode side 298 of the fuel cell 202), a pressure within the fuel cell stack 204 (e.g., of within the cathode side 296 or anode side 298 of the fuel cell 202), and/or a composition (e.g., a chemical composition) of the output products from the fuel cell assembly 200. In such a manner, it will be appreciated that in certain exemplary embodiments, the fuel cell sensor 302 may be a gas sensor, such as a multi-gas sensor.

The anode side 298 may support electrochemical reactions that generate electricity. A fuel may be oxidized in the anode side 298 with oxygen ions received from the cathode side 296 via diffusion through the electrolyte 300. The reactions may create heat, steam, and electricity in the form of free electrons in the anode side 298, which may be used to supply power to an energy consuming device (such as the one or more additional electric devices 328 described below). The oxygen ions may be created via an oxygen reduction of a cathode oxidant using the electrons returning from the energy consuming device into the cathode side 296.

The cathode side 296 may be coupled to a source of the cathode oxidant, such as oxygen in the atmospheric air. The cathode oxidant is defined as the oxidant that is supplied to the cathode side 296 employed by the fuel cell system in generating electrical power. The cathode side 296 may be permeable to the oxygen ions received from the cathode oxidant.

The electrolyte 300 may be in communication with the anode side 298 and the cathode side 296. The electrolyte 300 may pass the oxygen ions from the cathode side 296 to the anode side 298, and may have little or no electrical conductivity, so as to prevent passage of the free electrons from the cathode side 296 to the anode side 298.

The anode side of a solid oxide fuel cell 202 (such as the anode side 298 of fuel cell stack 204) may be composed of a nickel/yttria-stabilized zirconia (Ni/YSZ) cermet. Nickel in the anode side serves as a catalyst for fuel oxidation and current conductor. During normal operation of the fuel cell stack 204, the operating temperature may be greater than or equal to about 700 degrees C., and the nickel (Ni) in the anode remains in its reduced form due to the continuous supply of primarily hydrogen fuel gas. Alternatively, the anode side may include a small amount of nickel, or may be completely or substantially free of nickel.

The fuel cell assembly 200, and more specifically, the fuel cell stack 204 and the plurality fuel cells 202 therein, are positioned aft of the combustor 162 of the combustion section 114, or define an exhaust in a fluid communication with a location forward of the fuel cells 202 of the fuel cell stack 204, or both. In particular, for the embodiment depicted, fuel cell stack 204 is positioned aft of the combustor 162 of the combustion section 114, and as will be described in more detail below, defines the exhaust in fluid communication with the location forward of the fuel cells 202 of the fuel cell stack 204.

As shown in FIG. 3, the fuel cell assembly 200 also includes a fuel processing unit 304 and an air processing unit 306. The fuel processing unit 304 may be any suitable structure for generating a hydrogen rich fuel stream. For example, the fuel processing unit 304 may include a reformer, such as a catalytic partial oxidation ($CPO_x$) reformer for developing the hydrogen rich fuel stream for the fuel cell stack 204. The air processing unit 306 may be any suitable structure for raising the temperature of air that is provided thereto to a temperature high enough to enable fuel cell 202 temperature control (e.g., about 600 degrees C. to about 800 degrees C.). For example, in the embodiment depicted, the air processing unit includes a preburner system, operating based on a fuel flow through the second fuel line 150B, configured for raising the temperature of the air through combustion, e.g., during transient conditions such as startup, shutdown and abnormal situations.

In the exemplary embodiment depicted, the fuel processing unit 304 and air processing unit 306 are manifolded together within a housing 308 to provide conditioned air and fuel to the fuel cell stack 204. The housing 308 is configured as a pressure vessel configured to maintain an internal pressure in excess of a surrounding environment. For the embodiment depicted, the fuel cell stack 204, and the plurality of fuel cells 202 therein, are positioned within the housing 308.

In certain exemplary aspects, the fuel processing unit 304, the air processing unit 306, or both may also be positioned within the housing 308 at a location upstream of the fuel cell stack 204, or alternatively may be positioned external to the housing 308.

As will be appreciated, for the embodiment shown, the fuel cell assembly 200 is positioned in thermal communication with an exhaust gas flow 160 through the exhaust nozzle 156 during operation of the gas turbine engine 100. In such a manner, the exhaust gas flow 160 may be utilized to maintain a temperature of the fuel cell stack 204 within a desired temperature range. For example, the exhaust gas flow 160 may add heat to the fuel cell stack 204 during certain operations, and further may prevent a thermal runaway event during other operations.

Further, inclusion of the housing 308, with the fuel cell stack 204 positioned therein, may allow for the fuel cell stack 204, and the plurality of fuel cells 202 therein, to be pressurized relative to the exhaust gas flow 160 through the exhaust nozzle 156 during operation of the gas turbine engine 100. More specifically, such a configuration may allow for the fuel cell stack 204 to be in airflow communication with a high-pressure air source, such as the HP compressor 112, as discussed hereinabove. More specifically still, as noted above, the fuel cell 202 of the fuel cell stack 204 depicted includes the cathode 296, with the cathode in fluid communication with a high-pressure air source, such as the HP compressor 112. Briefly, it will be appreciated that in the embodiment shown, the fuel cell assembly 200, and more specifically, the fuel cell 202 of the fuel cell stack 204, defines a cathode exhaust 334, with the cathode exhaust 334 in fluid communication with the exhaust nozzle 156 for providing output products 336 from the cathode 296 to the exhaust gas flow 160 through the exhaust nozzle 156 during operation of the gas turbine engine 100.

Inclusion of the fuel cell stack 204 within a pressurized vessel (i.e., the housing 308 in the embodiment shown) may allow for a fuel cell assembly 200 having a relatively high power density.

It should be appreciated, however, that the fuel processing unit 304 may additionally or alternatively include any suitable type of fuel reformer, including but not limited to a catalytic partial oxidation (CPOx) reformer, an autothermal reformer, or a steam reformer that may need an additional stream of steam inlet with higher hydrogen composition at the reformer outlet stream. Additionally, or alternatively, still, the fuel processing unit 304 may include a reformer integrated with the fuel cell stack 204, in which case the fuel cell stack 204 may include fuel cells 202 with a redox stable anode (see FIGS. 9 through 12, below), or both. Similarly, it should be appreciated that the air processing unit 306 of FIG. 3 could alternatively be a heat exchanger or another device for raising the temperature of the air provided thereto to a temperature high enough to enable fuel cell 202 temperature control (e.g., about 600 degrees C. to about 800 degrees C.).

As mentioned above, the compressor bleed system (and air stream supply duct 288) is in airflow communication with the airflow delivery system for providing compressed airflow to the fuel cell assembly 200. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 204 (or rather to the cathode side 296 of the fuel cell(s) 202). The fuel delivery system 146 is configured to provide the first flow of fuel through the first fuel line 150A to the fuel processing unit 304, and the second flow of fuel through the second fuel line 150B to the air processing unit 306 (e.g., as fuel for a preburner system, if provided).

The fuel cell stack 204 outputs the power produced as a fuel cell power output 322. Further, the fuel cell stack 204 directs a cathode air discharge (the output products 336 from the cathode 296 through the cathode exhaust 334) into the exhaust nozzle 156 to merge with the exhaust gas flow 160 therethrough. The fuel cell stack 204 directs an anode fuel discharge (output products 336 from the anode 298) out of an anode exhaust 338 into a fuel recycle assembly 340, as will be discussed in more detail, below.

In operation, the air processing unit 306 is configured to heat/cool a portion of the compressed air, incoming through the cathode airflow duct 314, to generate a processed air to be directed into the fuel cell stack 204 to facilitate the functioning of the fuel cell stack 204. The air processing unit 306 receives the second flow of fuel from the second fuel line 150B and may, e.g., combust such second flow of fuel to heat the air received to a desired temperature (e.g., about 600 degrees C. to about 800 degrees C.) to facilitate the functioning of the fuel cell stack 204. The air processed by the air processing unit 306 is directed into the fuel cell stack 204. In an embodiment of the disclosure, as is depicted, the cathode bypass air duct 318 and the air processed by the air processing unit 306 may combine into a combined air stream to be fed into the cathode 296 of the fuel cell stack 204.

Further, as shown in the embodiment of FIG. 3, the first flow of fuel through the first fuel line 150A is directed to the fuel processing unit 304 for developing a hydrogen rich fuel stream (e.g., optimizing a hydrogen content of a fuel stream), to also be fed into the fuel cell stack 204. As will be appreciated, and as discussed below, the flow of air (processed air and bypass air) to the fuel cell stack 204 (e.g., the cathode side 296) and fuel from the fuel processing unit 304 to the fuel cell stack 204 (e.g., the anode side 298) may facilitate electrical power generation.

Because the inlet air for the fuel cell stack 204 may come solely from the upstream compressor section without any other separately controlled air source, it will be appreciated that the inlet air for the fuel cell stack 204 discharged from the compressor section is subject to the air temperature changes that occur at different flight stages. By way of illustrative example only, the air within a particular location in the compressor section of the gas turbine engine 100 may work at 200 degrees C. during idle, 600 degrees C. during take-off, 270 degrees C. during cruise, etc. This type of temperature change to the inlet air directed to the fuel cell stack 204 may lead to significant thermal transient issues (or even thermal shock) to the ceramic materials of the fuel cell stack 204, which could range from cracking to failure.

Thus, by fluidly connecting the air processing unit 306 between the compressor section and the fuel cell stack 204, the air processing unit 306 may serve as a control device or system to maintain the air processed by the air processing unit 306 and directed into the fuel cell stack 204 within a desired operating temperature range (e.g., plus or minus 100 degrees C., or preferably plus or minus 50 degrees C., or plus or minus 20 degrees C.). In operation, the temperature of the air that is provided to the fuel cell stack 204 can be controlled (relative to a temperature of the air discharged from the compressor section) by controlling the flow of fuel to the air processing unit 306. By increasing a fuel flow to the air processing unit 306, a temperature of the airflow to the fuel cell stack 204 may be increased. By decreasing the fuel flow to the air processing unit 306, a temperature of the airflow to the fuel cell stack 204 may be decreased. Optionally, no fuel can be delivered to the air processing unit 306 to prevent the air processing unit 306 from increasing and/or decreasing the temperature of the air that is discharged from the compressor section and directed into the air processing unit 306.

As briefly mentioned above, the fuel cell stack 204 converts the anode fuel stream from the fuel processing unit 304 and air processed by the air processing unit 306 sent into the fuel cell stack 204 into electrical energy, the fuel cell power output 322, in the form of DC current. This fuel cell power output 322 is directed to a power convertor 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be a power source, a power sink, or both. For example, the additional electrical devices 328 may be a power storage device (such as one or more batteries), an electric machine (an electric generator, an electric motor, or both), an electric propulsion device, etc. For example, the one or more additional electric devices 328 may include the starter motor/generator of the gas turbine engine 100.

Referring still to FIG. 3, the gas turbine engine 100 further includes a sensor 330. In the embodiment shown, the sensor 330 may be configured to sense data indicative of an operating condition of the gas turbine engine 100, as described in more detail below. The sensor 330 may be, for example, a speed sensor for sensing data indicative of a rotational speed of one or more components of the gas turbine engine 100. Additionally, or alternatively, the sensor 330 may be any other suitable sensor, or any suitable combination of sensors, configured to sense one or more gas turbine engine 100 operating conditions or parameters, including data indicative of a rotational speed of a component of the gas turbine engine 100.

Moreover, as is further depicted schematically in FIG. 3, the propulsion system, an aircraft including the propulsion system, or both, includes a controller 240. For example, the controller 240 may be a standalone controller, a gas turbine engine 100 controller (e.g., a full authority digital engine control, or FADEC, controller), an aircraft controller, supervisory controller for a propulsion system, a combination thereof, etc.

The controller 240 is operably connected to the various sensors, valves, etc. within at least one of the gas turbine engine 100 and the fuel delivery system 146. More specifically, for the exemplary aspect depicted, the controller 240 is operably connected to the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302. As will be appreciated from the description below, the controller 240 may be in wired or wireless communication with these components. In this manner, the controller 240 may receive data from a variety of inputs (including the gas turbine engine sensor 330 and the fuel cell sensor 302), may make control decisions, and may provide data (e.g., instructions) to a variety of output (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system (e.g., methods 500, 600, 700), as described herein, and/or any other operations or functions of the one or more computing device(s) 332. The instructions 332C can be software written in any suitable programming language or can be implemented in hardware. Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302, the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that the gas turbine engine 100, the exemplary fuel delivery system 146, and the exemplary fuel cell assembly 200 are provided by way of example only. In other embodiments, the fuel cell assembly 200 may have any other suitable configuration. For example, in other exemplary embodiments, the fuel cell assembly 200 may include any other suitable fuel processing unit 304. Additionally, or alternatively, the fuel cell assembly 200 may not require a fuel processing unit 304, e.g., when the combustor 162 of the gas turbine engine 100 is configured to burn hydrogen fuel and the fuel delivery system 146 is configured to provide hydrogen fuel to the fuel cell assembly 200.

Referring still to FIG. 3, it will be appreciated that the fuel cell 202 of the fuel cell stack 204 is further in communication with a location forward of the fuel cell 202 of the fuel cell stack 204 to provide output products 336 of the fuel cell 202 to the location. More specifically, as discussed above, the exemplary fuel cell 202 depicted includes the anode 298 defining the anode exhaust 338. The anode exhaust 338 is in fluid communication with the location forward of the fuel cell 202 of the fuel cell stack 204 to provide output products 336 from the anode 298 to the location. In particular, it will be appreciated that the turbomachine 104 defines a working gas flowpath 121 (not labeled; see, e.g., working gas flowpath 121 of FIG. 1). The anode exhaust 338 is in fluid communication with the working gas flowpath 121 at the location forward of the fuel cell 202 of the fuel cell stack 204.

More specifically, for the embodiment shown, the anode exhaust 338 is in communication with the location forward of the fuel cell 202 through the fuel recycle assembly 340. The fuel recycle assembly 340 generally includes a fuel recycle bus 342 having a plurality of recycle lines. In particular, for the embodiment shown, the plurality of recycle lines includes a first recycle line 344A extending from the anode exhaust 338 forward.

Optionally, but for the exemplary fuel recycle assembly 340 depicted, the fuel recycle assembly 340 further includes a fuel recycle heat exchanger 346 positioned in thermal communication with the exhaust gas flow 160 through the exhaust nozzle 156 for reducing a temperature of the output products 336 through the first recycle line 344A during operation, as well as a recycle pump 348 for increasing a pressure of the output products 336 through the first recycle line 344A during operation.

Further, for the embodiment of FIG. 3, the location forward of the fuel cell 202 is the combustor 162. More specifically, for the embodiment shown, the first recycle line 344A is in fluid communication with the third fuel line 150C, for providing output products 336 from the anode 298 of the fuel cell 202 of the fuel cell stack 204 to the combustor 162. More specifically, for the embodiment shown, the third fuel line 150C is in fluid communication with a primary fuel nozzle 350 of the combustion section 114, such that the fuel recycle assembly 340 is operable to provide output products 336 from the anode 298 of the fuel cell 202 of the fuel cell stack 204 to the combustor 162 through the third fuel line 150C and primary fuel nozzle 350.

In such a manner, it will be appreciated that the output products 336 from the anode 298 of the fuel cell 202 of the fuel cell stack 204 may be premixed with a fuel flow through the third fuel line 150C, which may be a hydrocarbon-based aviation fuel. In the embodiment shown, the fuel recycle assembly 340 includes a mixer 352 for mixing the output products 336 through the first recycle line 344A with the third fuel line 150C. The mixer 352 may include, e.g., an atomizer or other mixer structure.

As will be appreciated, the output products 336 from the anode 298 of the fuel cell 202 of the fuel cell stack 204 may include unspent fuel from the fuel cell 202 of the fuel cell stack 204. For example, in at least certain exemplary aspects, the output products 336 from the anode 298 of the fuel cell 202 (mixed with the fuel flow through the third fuel line 150C) may include a sufficient hydrogen gas content to support combustion of the output products 336.

Referring still to FIG. 3, for the embodiment shown, the fuel recycle assembly 340 is further configured to provide output products 336 from the anode 298 of the fuel cell 202 of the fuel cell stack 204 to other locations upstream of the fuel cell 202 of the fuel cell stack 204.

For example, in the embodiment shown, the fuel recycle bus 342 further includes a second recycle line 344B extending from the first recycle line 344A to the combustor 162 (and more specifically, to a combustion chamber (not labeled) defined by the combustor 162), at a location downstream of the primary fuel nozzle 350. In such a manner, the second recycle line 344B may provide output products 336 from the anode 298 having unspent fuel directly to the combustion chamber of the combustor 162 during at least certain operations of the gas turbine engine 100. Such may be utilized for, e.g., emission control purposes, power control purposes, etc.

Additionally, as is depicted in phantom in the embodiment of FIG. 3, the fuel recycle assembly 340 may additionally or alternatively be in fluid communication with one or more locations within the turbine section, may be in thermal communication with one or more locations within the compressor section or of the rotor assembly, or both.

In particular, for the embodiment shown, the fuel recycle assembly 340 further includes a third recycle line 344C, a fourth recycle line 344D, and a fifth recycle line 344E. The third recycle line 344C extends from the first recycle line 344A to the HP turbine 116 for providing output products 336 from the anode 298 of the fuel cell 202 to the working gas flowpath 121 (not labeled; see, e.g., working gas flowpath 121 of FIG. 1) at a location within the HP turbine 116. The fourth recycle line 344D extends from the first recycle line 344A to a location between the HP turbine 116 in the LP turbine 118 for providing output products 336 from the anode 298 of the fuel cell 202 to the working gas flowpath 121 at a location downstream of the HP turbine 116 and upstream of the LP turbine 118. The fifth recycle line 344E extends from the first recycle line 344A to the LP turbine 118 for providing output products 336 from the anode 298 of the fuel cell 202 to the working gas flowpath 121 at a location within the LP turbine 118. The output products 336 provided to the working gas flowpath 121 through the turbine section may be utilized for, e.g., downstream combustion to add power to a turbine within the turbine section, and may further prevent or reduce carbonization in the turbine section.

In addition, for the embodiment shown, the fuel recycle assembly 340 further includes a sixth recycle line 344F, a seventh recycle line 344G, and an eighth recycle line 344H. In such a manner, it will be appreciated that the fuel recycle assembly 340 may further be in communication with the compressor section of the turbomachine 104, the rotor assembly 102 of the gas turbine engine 100, or both. More specifically, in the embodiment shown, the fuel recycle assembly 340 includes an HP compressor heat exchanger 354, an LP compressor heat exchanger 356, and a rotor heat exchanger 358. The HP compressor heat exchanger 354 is in thermal communication with the working gas flowpath 121 through the HP compressor 112, the LP compressor heat exchanger 356 is in thermal communication with the working gas flowpath 121 through the LP compressor 110, and the rotor heat exchanger 358 is in thermal communication with an airflow through or from the rotor assembly 102, upstream of an inlet to the turbomachine 104 (see, e.g., annular inlet 108 and FIG. 1).

The sixth recycle line 344F extends to and is in thermal communication with the HP compressor heat exchanger 354 for providing heat from the output products 336 from the anode 298 flowing through the fuel recycle bus 342 to the working gas flowpath 121 through the HP compressor 112. The seventh recycle line 344G extends to and is in thermal communication with the LP compressor heat exchanger 356 for providing heat from the output products 336 from the anode 298 flowing through the fuel recycle bus 342 to the working gas flowpath 121 through the LP compressor 110. The eighth recycle line 344H extends to and is in thermal communication with the rotor heat exchanger 358 for providing heat from the output products 336 from the anode 298 flowing through the fuel recycle bus 342 to the airflow through or from the rotor assembly 102.

In such a manner, the fuel recycle assembly 340 may be configured to capture what may otherwise be waste heat and provide such heat back into, e.g., the working gas flowpath 121 of the turbomachine 104 to be utilized as a useful work for the gas turbine engine 100.

Notably, in the embodiment depicted, the output products 336 from the anode 298 flowing through the recycle lines 344F, 344G, 344H each circles back to the first recycle line 344A.

It will be appreciated that the exemplary fuel recycle assembly 340 depicted is provided by way of example only, and that in other embodiments, the fuel recycle assembly 340 may have any suitable configuration or combination of components.

Figure 4:
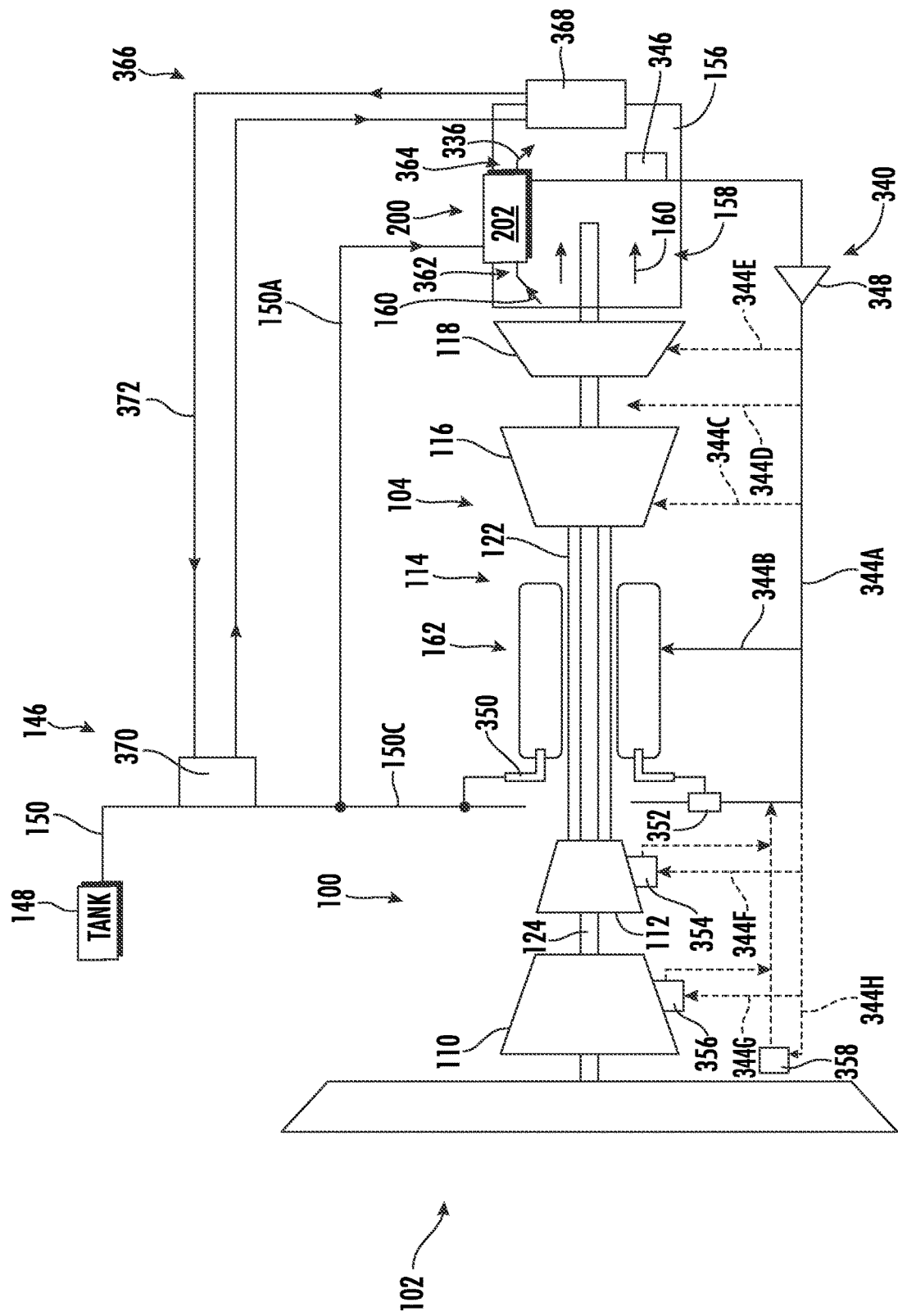
FIG. 4 is a schematic diagram of a gas turbine engine including a fuel cell assembly in accordance with another exemplary aspect of the present disclosure.

Referring now to FIG. 4, a gas turbine engine 100 and fuel cell assembly 200 in accordance with another exemplary embodiment of the present disclosure is provided. The exemplary gas turbine engine 100 and fuel cell assembly 200 depicted in FIG. 4 may be configured in substantially the same manner as exemplary gas turbine engine 100 and fuel cell assembly 200 described above with reference to FIG. 3, and accordingly the same or similar numbers may refer to the same or similar parts.

For example, in the embodiment of FIG. 4, the gas turbine engine 100 generally includes a rotor assembly 102 and a turbomachine 104 having an LP compressor 110, an HP compressor 112, a combustion section 114, an HP turbine 116, and an LP turbine 118. Further, the turbomachine 104 includes an exhaust nozzle 156 defining an exhaust gas flowpath 158 having an exhaust gas flow 160 therethrough during operation. Moreover, a fuel delivery system 146 is provided having a fuel source 148, a first fuel line 150A extending from the fuel source 148 to the fuel cell assembly 200, and a third fuel line 150C extending from the fuel source 148 to the combustion section 114 of the turbomachine 104.

In addition, for the exemplary embodiment depicted, the fuel cell assembly 200 includes a fuel cell 202 positioned aft of a combustor 162 of the combustion section 114 and in communication with the exhaust gas flow 160 through the exhaust gas flowpath 158 of the exhaust nozzle 156 during operation of the gas turbine engine 100. Although a single fuel cell 202 is depicted schematically in FIG. 4, it will be appreciated that the fuel cell 202 may be a single fuel cell 202 of a plurality of fuel cells 202 of a fuel cell stack 204 of the fuel cell assembly 200 (see, e.g., FIG. 2).

However, in the embodiment of FIG. 4 the fuel cell 202 of the fuel cell assembly 200 is arranged in an open flow configuration with the exhaust gas flowpath 158. More specifically, in the embodiment of FIG. 4, the fuel cell 202 defines an inlet 362 positioned to receive a portion of the exhaust gas flow 160 from the exhaust gas flowpath 158, an outlet 364 positioned to provide output products 336 directly to the exhaust gas flow 160 of the exhaust gas flowpath 158, or both. More specifically, still, in the embodiment of FIG. 4 the fuel cell 202 defines the inlet 362 positioned to receive the portion of the exhaust gas flow 160 directly from the exhaust gas flowpath 158, and the outlet 364 positioned to provide output products 336 directly to the exhaust gas flow 160 of the exhaust gas flowpath 158.

It will be appreciated, that is used herein, the term "directly" in the context of providing output products 336 to the exhaust gas flow 160, refers to providing the output products 336 to the exhaust gas flow 160 first relative to other locations along the working gas flowpath 121 (e.g., providing the output products 336 to the exhaust gas flow 160 within the exhaust nozzle 156), and not providing output products 336 to an upstream location (e.g., the combustion section 114 or turbine section) and allowing the output products 336 to flow along the working gas flowpath 121 to the exhaust gas flow 160 (working gas flowpath 121 not labeled in FIG. 4, see, e.g., working gas flowpath 121 of FIG. 1). Additionally, the term "directly" in the context of receiving the portion of the exhaust gas flow 160, refers to receiving the portion of the exhaust gas flow 160 from the exhaust gas flowpath 158 without any intervening conditioning structure materially altering a temperature or a pressure of the portion of the exhaust gas flow 160 received (e.g., without changing the temperature or the pressure more than 10% from a temperature or a pressure of the portion of the exhaust gas flow 160 when received from the exhaust gas flowpath 158).

Briefly, it will be appreciated that the exemplary gas turbine engine 100 of FIG. 4 further includes a thermal bus assembly 366 having a heat source exchanger 368, a heat sink exchanger 370, and a thermal bus 372 in fluid communication with the heat source exchanger 368 and the heat sink exchanger 370. The heat source exchanger 368 is in thermal communication with output products 336 from the fuel cell 202 of the fuel cell assembly 200. In such a manner, the heat source exchanger 368 may be operable to transfer heat from the output products 336 from the fuel cell 202 of the fuel cell assembly 200 to a thermal fluid of the thermal bus assembly 366 flowing through the thermal bus 372. The heat sink exchanger 370 is in thermal communication with a fuel line 150 of the fuel delivery system 146. In such manner, the heat sink exchanger 370 may be operable to transfer heat from the thermal fluid of the thermal bus assembly 366 flowing through the thermal bus 372 to a fuel flow through the fuel line 150 of the fuel delivery system 146. This may allow for the thermal bus assembly 366 to capture waste heat and provide such waste heat to one or more heatsinks, such as the fuel delivery system 146, allowing such waste heat to be utilized as useful work for the gas turbine engine 100.

Referring still to the fuel cell 202 of the fuel cell assembly 200 of FIG. 4, it will be appreciated that the fuel cell 202 may be configured in any suitable manner to receive the portion of the exhaust gas flow 160.

Figure 5:
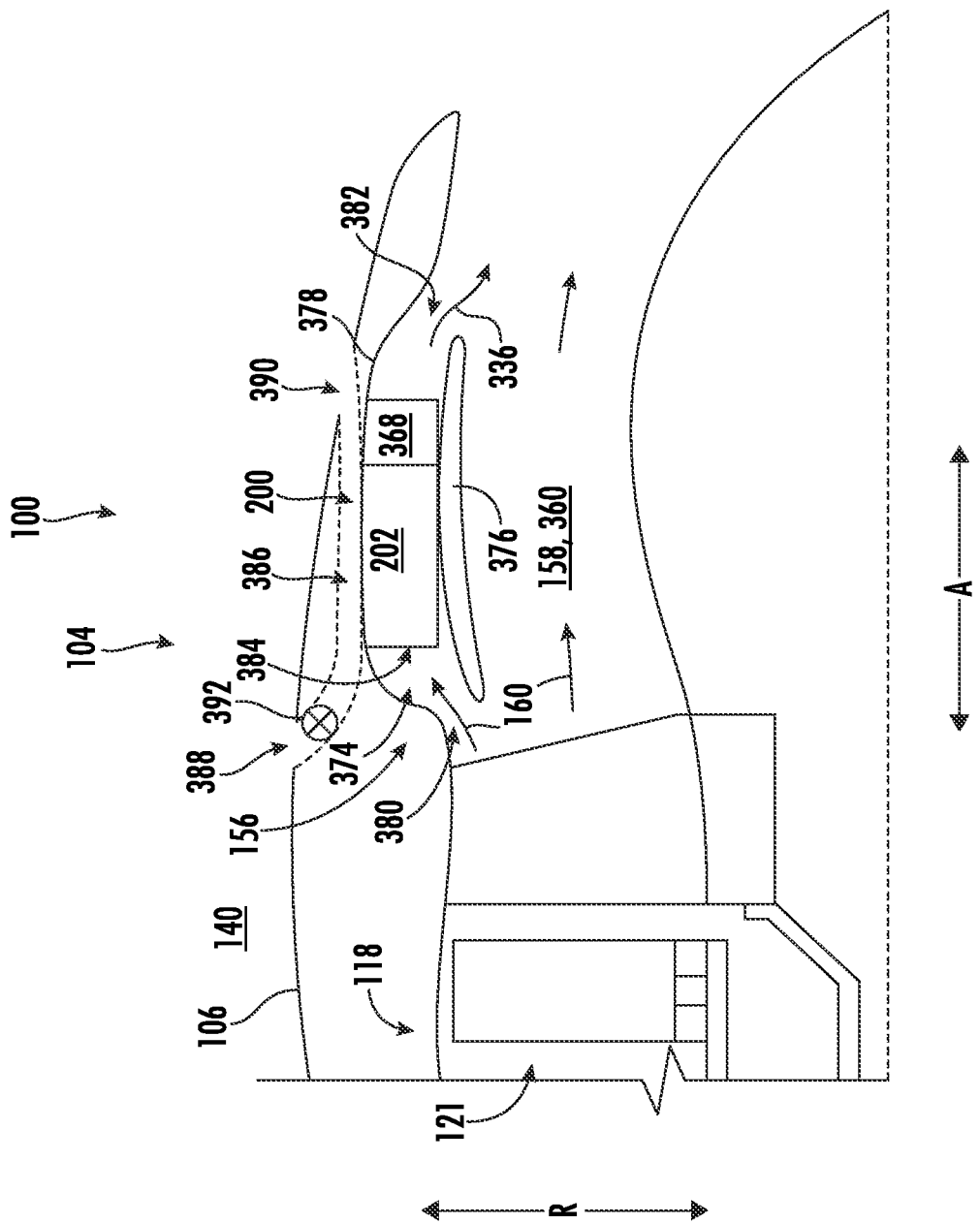
FIG. 5 is a schematic diagram of a fuel cell assembly in a fuel cell flowpath in accordance with an exemplary aspect of the present disclosure.

In particular, referring now to FIG. 5, a close-up, schematic view is depicted of an aft end of a gas turbine engine 100 in accordance with an exemplary aspect of the present disclosure, in particular, in accordance with the exemplary gas turbine engine 100 of FIG. 4.

In the exemplary aspect of the gas turbine engine 100 depicted in FIG. 5, the exhaust gas flowpath 158 defined by the exhaust nozzle 156 is more specifically a primary exhaust gas flowpath 360. In addition, the turbomachine 104 defines a fuel cell flowpath 374 in parallel with the primary exhaust gas flowpath 360. More specifically, the fuel cell flowpath 374 is located outward of the primary exhaust gas flowpath 360 along a radial direction R of the gas turbine engine 100. More specifically, still, the turbomachine 104 includes a splitter 376 positioned inward along the radial direction R from an outer liner 378 of the exhaust nozzle 156, defining an inlet 380 to the fuel cell flowpath 374 at a forward end of the splitter 376, and an outlet 382 of the fuel cell flowpath 374 at an aft and of the splitter 376.

The fuel cell 202 is in fluid communication with the fuel cell flowpath 374, positioned outward of the primary exhaust gas flowpath 360 along the radial direction R of the gas turbine engine 100. In particular, for the embodiment shown the fuel cell 202 is positioned within the fuel cell flowpath 374 to receive a portion of the exhaust gas flow 160 through the fuel cell flowpath 374. More specifically, still, the fuel cell 202 defines a cathode inlet 384 positioned within the fuel cell flowpath 374 for receiving the portion of the exhaust gas flow 160 through the fuel cell flowpath 374.

Such a configuration may allow for the fuel cell 202 to receive the portion of the exhaust gas flow 160 through the fuel cell flowpath 374 without negatively affecting an overall pressure drop of the exhaust gas flow 160 through the exhaust nozzle 156. For example, in at least certain exemplary aspects, up to 10% of the exhaust gas flow 160 may be provided through the inlet 380, such as up to 5%, such as up to 2%. This may ensure a pressure drop applied to the portion of the exhaust gas flow 160 through the fuel cell flowpath 374 does not result in an overall pressure drop through the exhaust nozzle 156 greater than an undesired threshold.

With such a configuration, the parallel flow arrangement may allow for more efficient heat transfer by allowing for a higher pressure drop across the heat source exchanger 368, again without negatively affecting the overall pressure drop of the exhaust gas flow 160 through the exhaust nozzle 156.

Notably, with such a configuration, the fuel cell assembly 200, and more specifically, the fuel cell 202, may further be in thermal communication with one or other radially outward locations. More specifically, it will be appreciated that the gas turbine engine 100 further defines a bypass airflow passage 140 over the turbomachine 104. In the embodiment of FIG. 5, the fuel cell 202 is in selective thermal communication with the bypass airflow passage 140. More specifically, the turbomachine 104 defines a cooling passage 386 extending between an inlet 388 in fluid communication with the bypass airflow passage 140 and an outlet 390 in fluid communication with the bypass airflow passage 140 at a location downstream of the inlet 388. A valve 392 is positioned within the cooling passage 386 to modulate an amount of bypass airflow flowing therethrough. The cooling passage 386 is in thermal communication with the fuel cell 202. In such a manner, the cooling passage 386 may regulate a temperature of the fuel cell 202, e.g., in a thermal runaway event. Additionally, or alternatively, the cooling passage may provide cooling to other components of the fuel cell assembly 200.

Further, for the embodiment of FIG. 5, a heat source exchanger 368 is also located in the fuel cell flowpath 374 downstream of the fuel cell 202. The heat source exchanger 368 may receive substantially exclusively output products 336 (at least 75% of a total heating fluid flow being output products, such as at least 85%, such as at least 90%) from the fuel cell 202 and may be part of a thermal bus assembly (such as thermal bus assembly 366 of FIG. 4). With such a configuration, the parallel flow arrangement may allow for more efficient heat transfer by allowing for a higher pressure drop across the heat source exchanger 368, again without negatively affecting the overall pressure drop of the exhaust gas flow 160 through the exhaust nozzle 156.

Figure 6:
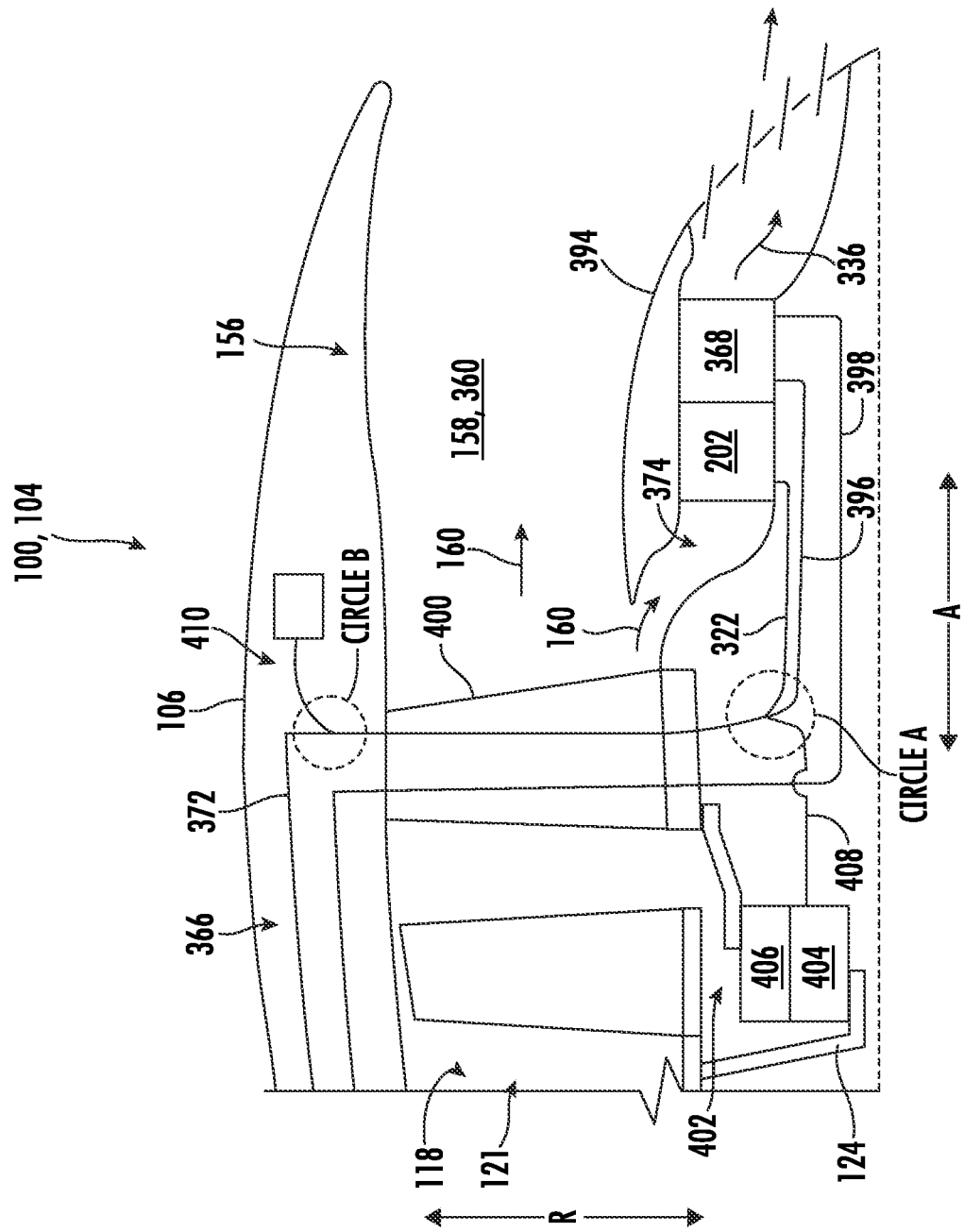
FIG. 6 is a schematic diagram of a fuel cell assembly in a fuel cell flowpath in accordance with another exemplary aspect of the present disclosure.

Referring now to FIG. 6, a close-up, schematic view is depicted of an aft end of a gas turbine engine 100 and fuel cell assembly 200 in accordance with yet another exemplary aspect of the present disclosure. The exemplary gas turbine engine 100 and fuel cell assembly 200 may be configured in a similar manner as the exemplary gas turbine engine 100 and fuel cell assembly 200 described above with reference to FIGS. 4 and 5. Accordingly, the exemplary gas turbine engine 100 generally includes a turbomachine 104 having an exhaust nozzle 156 defining an exhaust gas flowpath 158, and more specifically, defining a primary exhaust gas flowpath 360. As with the exemplary embodiment of FIG. 5, the exemplary exhaust nozzle 156 of FIG. 6 further defines a fuel cell flowpath 374 spaced from the primary exhaust gas flowpath 360 along a radial direction R of the gas turbine engine 100. A portion of an exhaust gas flow 160 through the exhaust nozzle 156 is provided through the fuel cell flowpath 374. A fuel cell 202 of the fuel cell assembly 200 is in fluid communication with the fuel cell flowpath 374 for receiving the portion of the exhaust gas flow 160 through the fuel cell flowpath 374.

However, for the embodiment of FIG. 6, the fuel cell flowpath 374 is instead positioned inward of the primary exhaust gas flowpath 360 along the radial direction R of the gas turbine engine 100. In such a manner, it will be appreciated that the turbomachine 104 further includes a tail cone 394 and the fuel cell 202 is positioned partially within the tail cone 394.

Further, as with the embodiment of FIG. 5, in the embodiment of FIG. 6, a heat source exchanger 368 is positioned downstream of the fuel cell 202, and in thermal communication with flow of output products 336 from the fuel cell 202.

It will be appreciated that for the embodiment of FIG. 6, the heat source exchanger 368 is configured as part of a thermal bus assembly 366 further comprising a thermal bus 372. The thermal bus 372 is in fluid communication with the heat source exchanger 368, and more specifically includes a first portion 396 providing a flow of relatively cool thermal fluid to the heat source exchanger 368 and a second portion 398 providing a flow of relatively hot thermal fluid away from the heat source exchanger 368.

More specifically, it will be appreciated that the turbomachine 104 further includes a turbine rear frame 400 positioned downstream of an LP turbine 118 extending through the working gas flowpath 121. In the embodiment shown, the first portion 396 of the thermal bus 372 and the second portion 398 of the thermal bus 372 each extends through the turbine rear frame 400.

Further, for the embodiment shown the gas turbine engine 100 further includes an electric machine 402. The electric machine 402 is positioned inward of at least a portion of the working gas flowpath 121 of the turbomachine 104 along the radial direction R of the gas turbine engine 100. More specifically, the electric machine 402 is positioned inward of the working gas flowpath 121 along the radial direction R within or downstream of the turbine section. More specifically, still, for the embodiment depicted, the electric machine 402 includes a rotor 404 rotatable with the LP turbine 118 and a stater 406 coupled to the turbine rear frame 400. The electric machine 402 may be configured to convert electric power to mechanical power, such as to a mechanical torque applied to an LP shaft 124 rotatable with the LP turbine 118. Additionally, or alternatively, the electric machine 402 may be configured to convert mechanical power to electric power.

The gas turbine engine 100 further includes an electric line 408, which may deliver electric power to the electric machine 402 or may receive electric power from the electric machine 402. The electric line 408 is in electric communication with an electric bus 410. In particular, for the embodiment shown, it will be appreciated that the fuel cell 202 includes a fuel cell power output 322 that is in electric communication with the electric line 408, as well as the with the electric bus 410. In such a manner, the fuel cell 202 may provide electric power to the fuel cell power output 322, which may in turn provide such electric power to the electric line 408 and electric machine 402.

Alternatively, electric power from both the fuel cell 202 and the electric machine 402 may be provided to the electric bus 410.

Notably, the electric bus 410 further extends through the working gas flowpath 121, which may be a relatively harsh environment. Accordingly, in the embodiment of FIG. 6, the electric bus 410 extends through the first portion 396 of the thermal bus 372 to maintain a temperature of the electric bus 410 within an acceptable temperature range during operation of the gas turbine engine 100.

Figure 7:
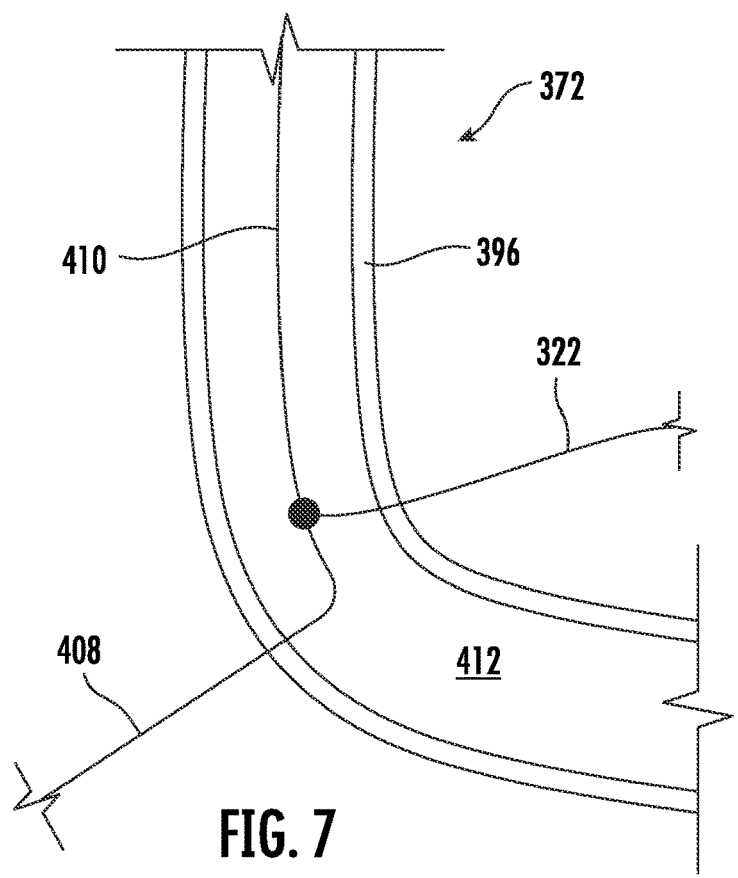
FIG. 7 is a schematic view of a first aspect of a thermal bus and electric bus in accordance with an exemplary aspect of the present disclosure.

Briefly, referring to FIG. 7, providing a close-up, schematic view of a section of the electric bus 410 and thermal bus 372 identified in Circle A in FIG. 6, the fuel cell power output 322 and the electric line 408 may connect to the electric bus 410 at a location inward of the working gas flowpath 121 (FIG. 6) along the radial direction R and extend through an interior 412 of the first portion 396 of the thermal bus 372, enclosed by the first portion 396 of the thermal bus 372 so as to be insulated from the relatively harsh environment of the working gas flowpath 121 through the turbine rear frame 400 (FIG. 6). Similarly, referring to FIG. 8, providing a close-up, schematic view of a second section of the electric bus 410 and thermal bus 372 identified in Circle B in FIG. 6, the electric bus 410 may exit from the interior 412 of the first portion of the thermal bus 372 at a location outward of the working gas flowpath 121 (FIG. 6) along the radial direction R.

Referring back briefly to FIG. 4, it will be appreciated that for the embodiment depicted, the fuel cell 202 of the fuel cell assembly 200 is configured to receive a fuel flow from the first fuel line 150A. For the embodiment shown, the fuel cell assembly 200 does not include a fuel processing unit upstream of the fuel cell 202 of the fuel cell assembly 200. In such a manner, the fuel cell 202 of the fuel cell assembly 200 may be configured to receive a hydrocarbon-based aviation fuel. In particular, the fuel cell 202 of the fuel cell assembly 200 depicted in FIG. 4 may be a solid oxide fuel cell having a redox stable anode.

Referring now to 9, a fuel cell assembly 200 is depicted schematically generally including a fuel cell stack 204 having a fuel cell 202 configured as a solid oxide fuel cell (or rather, a plurality of fuel cells 202 arranged, e.g., in series, configured as solid oxide fuel cells). The fuel cell stack 204 is depicted as a single fuel cell 202 for simplicity in FIG. 9. The solid oxide fuel cell generally includes a cathode 296, an electrolyte layer 300, and an anode 298 positioned opposite the electrolyte layer 300 from the cathode 296. With certain configurations, the anode 298 includes a cermet having a relatively high nickel concentration. For example, the cermet may be a nickel/yttria-stabilized zirconia (Ni/YSZ) cermet. While such a configuration provides certain benefits to the solid oxide fuel cell in the form of, e.g., electrical conductance, there are certain operational limitations when the solid oxide fuel cell is utilized in, e.g., aeronautical obligations. In order to address one or more of these operational limitations, the inventors of the present disclosure have come up with an aeronautical assembly having a more stable solid oxide fuel cell that may address one or more operational limitations.

In particular, for the exemplary embodiment of FIG. 9, the anode 298 of the fuel cell 202 is configured as an operationally stable anode (i.e., a "redox stable anode"), as will be described in more detail below. In particular, the anode 298 may be capable of performing internal fuel reforming operations, and may be further configured to accommodate oxygen-containing gas across a wider temperature range. As such, it will be appreciated that for the embodiment shown, the fuel cell assembly 200 does not include a separate fuel processing unit configured to convert a hydrocarbon based fuel to a hydrogen fuel. In particular, a fuel supply of an aircraft including the depicted system may be a hydrocarbon fuel supply, and the fuel cell assembly may be configured to provide a hydrocarbon fuel from the hydrocarbon fuel supply to the anode 298. The hydrocarbon fuel supply may be a fuel supply without a fuel reformer (providing hydrocarbon fuel that has not been passed through, e.g., an on-board fuel reformer). More specifically, for the embodiment shown, the fuel cell assembly 200 includes a fuel line in fluid communication with the first fuel line 150A of the fuel supply for receiving the hydrocarbon fuel and providing the hydrocarbon fuel to the anode 298 of the fuel cell 202.

Figure 8:
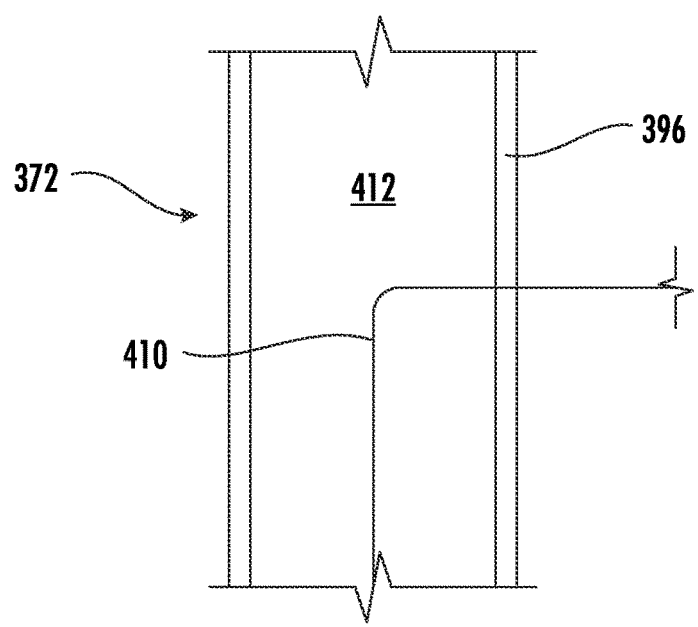
FIG. 8 is a schematic view of a first aspect of a thermal bus and electric bus in accordance with an exemplary aspect of the present disclosure.

In addition, it will be appreciated that a flow of oxygen-containing gas is provided to the anode 298, which may be a portion of the exhaust gas flow 160 (see, e.g., FIG. 8).

As will further be appreciated from the description herein the internal fuel reforming operations may create a relatively high amount of heat within the fuel cell. In such a manner, the fuel cell assembly may be configured to control the flow of oxygen-containing gas to the anode 298, the flow of hydrocarbon fuel to the anode 298, or both. Such control may be in response to one or more thermal demands on or for the fuel cell assembly 200 (e.g., a temperature of the fuel cell stack 204), one or more thermal demands on or for the gas turbine engine (e.g., heat energy demands within a combustor of the combustion section of the gas turbine engine, combustion dynamics within the combustor of the combustion section of the gas turbine engine), etc.

Figure 9:
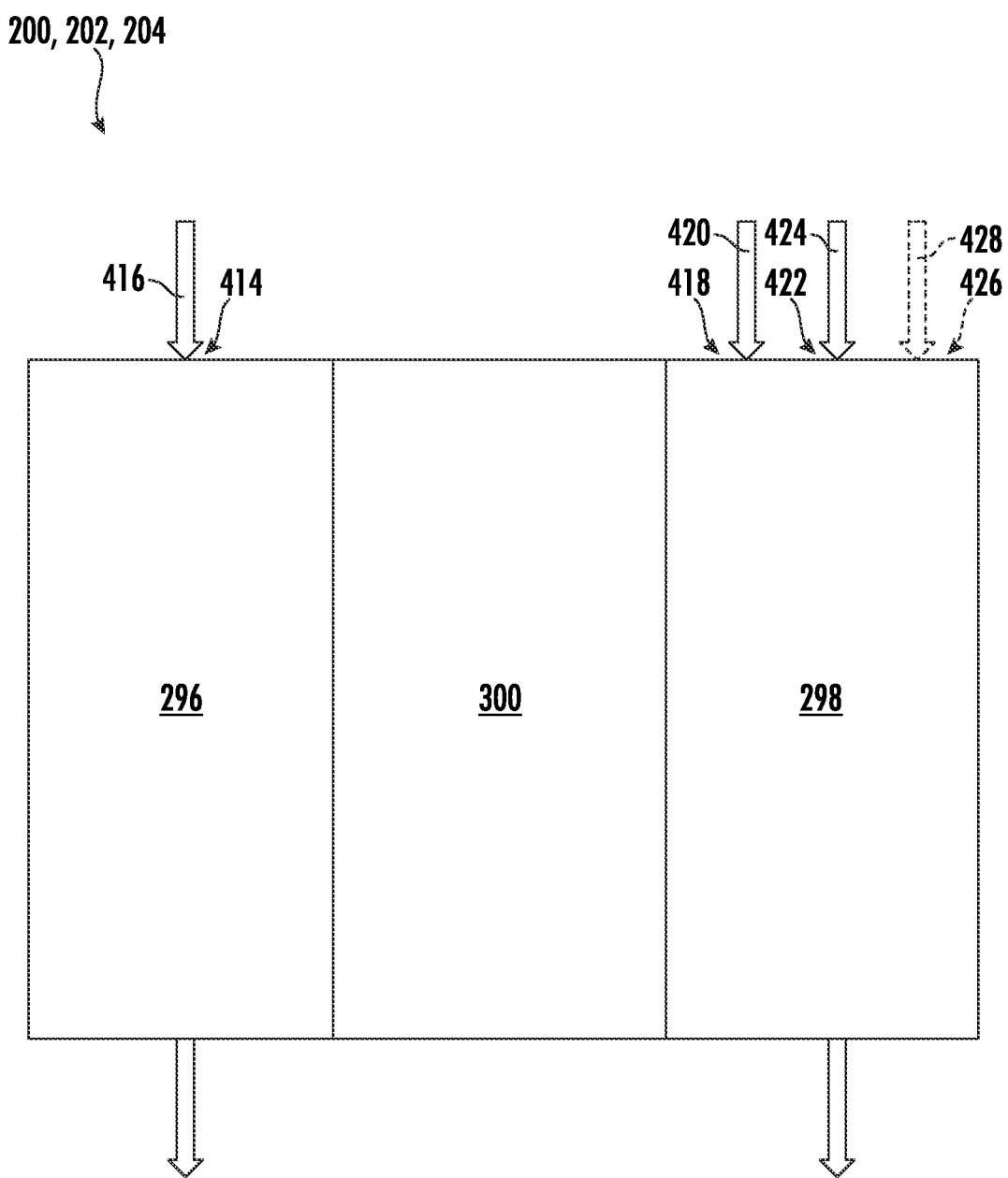
FIG. 9 is a close-up schematic view of a fuel cell of a fuel cell assembly in accordance with an exemplary aspect of the present disclosure.

Referring still to FIG. 9, the cathode 296 defines an inlet 414 configured to receive a first airflow 416. The anode 298 defines a second inlet 418 for receiving a second airflow 420. The second airflow 420 may be a portion of an exhaust gas flow or may be an airflow from an air delivery assembly. The anode 298 further defines a third inlet 422 for receiving a hydrocarbon fuel 424. In such a manner, the fuel cell 202 may be incorporated into a fuel cell assembly 200 without a fuel processing unit.

As depicted in phantom, however, the anode 298 of the fuel cell may further define a fourth inlet 426 configured to receive a reformed fuel 428 from a fuel processing unit (see, e.g., FIG. 3). In such a manner, the fuel cell 202 may further be incorporated into a fuel cell assembly 200 having a fuel processing unit.

As will be appreciated, the anode 298 generally includes a composite material including a ceramic phase and a metallic phase (i.e., a cermet) that is operationally stable. The metallic phase may be finely dispersed within the ceramic matrix of the ceramic phase. As used herein, the term "operationally stable" means that the presence of oxidizing gas (e.g., oxygen) at the anode 298 at the normal operating temperature of the fuel cell assembly of, e.g., 600 degrees C. to 1000 degrees C., does not result in significant oxidation of the metal phase of the cermet in the anode 298. For example, the oxygen content of the oxidizing gas over the anode 298 may be greater than about 0.1% by mass, such as greater than about 2% by mass, such as greater than about 5% by mass (and, e.g., up to 100% oxygen). In an embodiment, the anode 298 of the operationally stable fuel cell may have substantially no nickel content. In another embodiment, the anode 298 of the operationally stable fuel cell may have a nickel content less than or equal to about 25% volume percent (volume of nickel over total volume, or vol/vol), such as less than or equal to about 10% vol/vol, such as less than or equal to about 5% vol/vol, such as less than or equal to about 1% vol/vol, or such as less than or equal to about 0.5% vol/vol.

The ceramic phase of the anode 298 may comprise any suitable ionically conductive ceramic material, such as a doped ceria and/or a doped zirconia. For example, the ceramic phase may include, but is not limited to yttria stabilized zirconia (YSZ), gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), or the like.

The metallic phase of the anode 298 may comprise perovskite-based catalysts and p-type or n-type semiconductors. Perovskite-based catalysts have a crustal structure resembling that of the mineral perovskite, which consists of calcium titanium oxide ($CaTiO_3$). The general chemical formula for a perovskite-based catalyst is $ABX_3$. A and B are two different cations. X is an anion, frequently an oxide. The anion bonds the two cations. The perovskite-based catalysts may also have a double-perovskite structure (i.e., $A_2B_2O_6$).

Examples of suitable perovskite-based catalysts include titanate-based materials, such as lanthanum strontium titanate ($LaSrTiO_3$), strontium titanate ($SrTiO_3$), Nb Titanates (niobium-doped $SrTiO_3$), calcium titanate ($CaTiO_3$), lead titanate ($PbTiO_3$), and the like. Additional examples of suitable perovskite-based catalysts include lanthanum strontium iron molybdenum oxide ($LaSrFeMoO_6$), bismuth ferrite ($BiFeO_3$), lanthanum ytterbium oxide ($LaYbO_3$), silicate perovskite ($MsSiO_3$), lanthanum manganite ($LaMnO_3$), yttrium aluminum perovskite ($YAlO_3$), and the like. Examples of suitable p or n type semiconductors include boron doped silicon, aluminum doped silicon, boron doped germanium, arsenic doped silicon, phosphorus doped silicon, arsenic doped germanium, phosphorus doped germanium and the like. In the alternative or in addition, the metallic phase of the anode 298 may comprise any suitable metal catalyst, such as nickel (Ni), cobalt (Co), copper (Cu), alloys thereof, or the like, which operates as an electron conductor.

In an embodiment, the operationally stable fuel cell may also possess internal fuel reforming capabilities, i.e., the fuel cell may be capable of catalytic partial oxidation (CPOx) fuel reforming. Thus, in an embodiment a separate fuel processing unit (see, e.g., fuel processing unit 304 of FIG. 3) may be optional. However, even in an embodiment with internal fuel reforming capabilities, the operationally stable fuel cell assembly may also operate effectively with reformate (e.g., using a separate fuel processing unit).

In embodiments, the internal fuel reforming capabilities are provided by the cermet material of the anode 298. In embodiments, the internal fuel reforming capabilities may be enhanced and/or provided by the introduction of a precious metal (e.g., platinum, ruthenium, palladium, and the like) or other ceramic materials, such as doped cerium oxides, including gadolinia-doped ceria (GDC), samaria-doped ceria (SDC), and the like, on the surface of the anode or on any surface within the fuel cell assembly that contacts the fuel upstream from the anode 298.

The operational stability of the solid oxide fuel cell produces advantages over prior solid oxide fuel cells 204. The anode 298 is less susceptible to oxidation due to conditions in which an oxidizing gas is present over the anode 298 at operating or otherwise elevated temperatures (e.g., above 230 degrees F.). Examples of such conditions include abnormal shutdown or oxidating gas flowing from the combustion chamber prior to fuel cell cooling. Accordingly, the anode 298 has increased volumetric stability during redox and/or thermal cycling, and thus is less prone to the structural damage associated with volumetric changes in the anode 298. Further, in embodiments of the operationally stable fuel cell with an anode 298 having substantially no nickel content or an anode 298 having a nickel content less than or equal to about 25% vol/vol, such as less than or equal to about 10% vol/vol, such as less than or equal to about 5% vol/vol, such as less than or equal to about 1% vol/vol, or such as less than or equal to about 0.5% vol/vol, such may eliminate or reduce the threat of production of the toxic gas nickel carbonyl due to oxidation of the nickel in the anode 298.

The advantages of the operationally stable fuel cell assembly discussed herein may produce savings in the manufacture and operation of the aircraft. The operational stability of the fuel cell assembly allows for reduced shutdown and startup times, more flexibility in shutdown and startup procedures, and lessened need for external controls to guarantee safety and reliability. In addition, the internal fuel reforming capabilities provide flexibility and redundancy in the operation of the fuel cell assembly, and when the separate fuel processing unit (see, e.g., fuel processing unit 304 of FIG. 3) is not included, may reduce weight and system complexity. Furthermore, internal fuel reforming actions may create a relatively high amount of heat which may assist with heating the fuel cell stack during a startup sequence of the fuel cell assembly.

Further explanation and benefits will be appreciated from the following

EXAMPLES

Example 1, Redox Stress Tests: Comparative Nickel/Yttria Stabilized Zirconia (Ni/YSZ) Cermet Anode Fuel Cell Stack A 2-cell 100 cm² fuel cell stack with nickel/yttria stabilized zirconia anodes was subjected to a redox stress testing as described below. The fuel cell stack was brought to operating temperature (about 800 degrees C.) and fuel and air flow commenced. An open circuit operating voltage was measured to obtain a baseline (cycle 0). The fuel cell stack was shut down using normal conditions and cooled (i.e., cooling was conducted with protective hydrogen flow).

The fuel cell stack was brought to operating temperature and fuel and air flow commenced for a second time. An open circuit operating voltage was measured and compared to baseline to determine if damage had occurred in the previous shutdown (cycle 1). The fuel cell stack was shut down using normal conditions and cooled (i.e., cooling was conducted with protective hydrogen flow) for a second time.

The fuel cell stack was brought to operating temperature and fuel and air flow commenced for a third time. An open circuit operating voltage was measured and compared to baseline to determine if damage had occurred in the previous shutdown (cycle 2). The fuel cell stack was shut down using under redox stress conditions, e.g., conditions allowing for oxidation of the anode. Specifically, fuel and air flow were stopped at the operating temperature. The anode gas lines were purged with nitrogen gas for five minutes for safety. The fuel cell stack was allowed to cool while allowing air to diffuse into the fuel lines. Cooling proceeded at about 1.5 degrees C./min for 12 hours total time (some stacks only cooled to 90-100 degrees C.).

The fuel cell stack was brought to operating temperature and fuel and air flow commenced for final time. An open circuit operating voltage was measured and compared to baseline to determine if damage had occurred in the previous shutdown (cycle 3).

Figure 10:
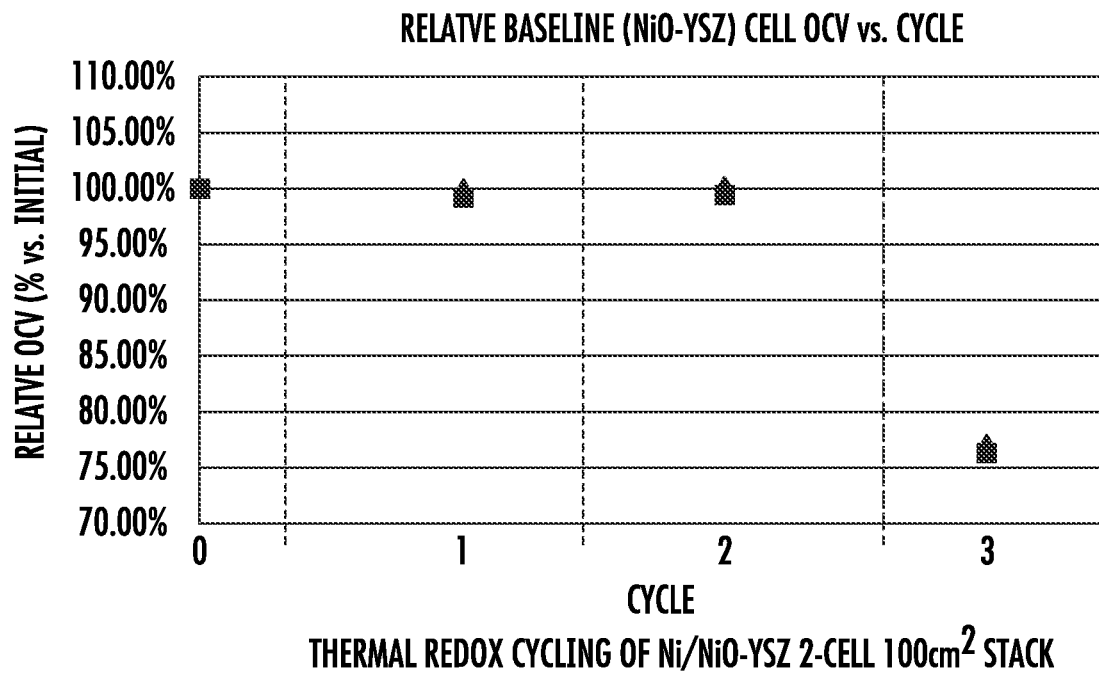
FIG. 10 is a graph showing an open circuit operating voltage (OCV) percentage of a fuel cell stack with nickel/yttria stabilized zirconia anodes during redox cycling.

The results are shown in FIG. 10, wherein the x-axis represents a cycle number and the y-axis represents an open circuit voltage ("OCV") of the cycle relative to a baseline OCV. The marker on the y-axis represents the baseline OCV (cycle 0). The first two vertical lines (i.e., the vertical lines immediately to the right of the y-axis) represent thermal cooling with protective hydrogen flow. The third vertical line represents the thermal cooling under redox stress conditions. When cooling was conducted with protective hydrogen flow the subsequent OCV was 100% of baseline (cycles 1 and 2). Cooling under redox stress conditions, however, resulted in an irreversible damage to the fuel cell stacks as shown by the OCV of cycle 3, which is about 75% of the baseline OCV. Moreover, at the stack outlet, no hydrogen gas was detectible at OCV after the redox stress cooling cycle, which indicates that the volumetric changes associated with the oxidation of the nickel produced irreversible structural damage to the electrolyte layer and resulted in the burning of nearly all of the hydrogen in the stack.

Example 2: Operationally Stable Lanthanum Strontium Titanate/Gadolinia-Doped Ceria (LST/GDC) Cermet Anode Fuel Cell Stack Two 2-cell fuel cell stacks with lanthanum strontium titanate/gadolinia-doped ceria anodes with hydrogen plasma condition with a standard or modified surface preparation were subjected to a redox stress test as described below. The fuel cell stack was brought to operating temperature (about 800 degrees C.) and fuel and air flow commenced. An open circuit operating voltage was measured to obtain a baseline (cycle 1). The fuel cell stack was shut down using normal conditions and cooled (i.e., cooling was conducted with protective hydrogen flow).

The fuel cell stack was brought to operating temperature and fuel and air flow commenced for a second time. An open circuit operating voltage and a stack outlet hydrogen gas percentage were measured and compared to baseline to determine if damage had occurred in the previous shutdown (cycle 2).

The fuel cell stack was repeatedly shut down using under redox stress conditions, e.g., conditions allowing for oxidation of the anode. Specifically, fuel and air flow were stopped at the operating temperature. The anode gas lines were purged with nitrogen gas for five minutes for safety. The fuel cell stack was allowed to cool while allowing air to diffuse into the fuel lines. Cooling proceeded at about 1.5 degrees C./min for 12 hours total time (some stacks only cooled to 90-100 degrees C.). After each shutdown an open circuit operating voltage was measured and compared to baseline to determine if damage had occurred in the previous shutdown (cycles 3-5). In cycles 3 and 4 a stack outlet hydrogen gas percentage were measured and compared to baseline to determine if damage had occurred in the previous shutdown.

Figure 11:
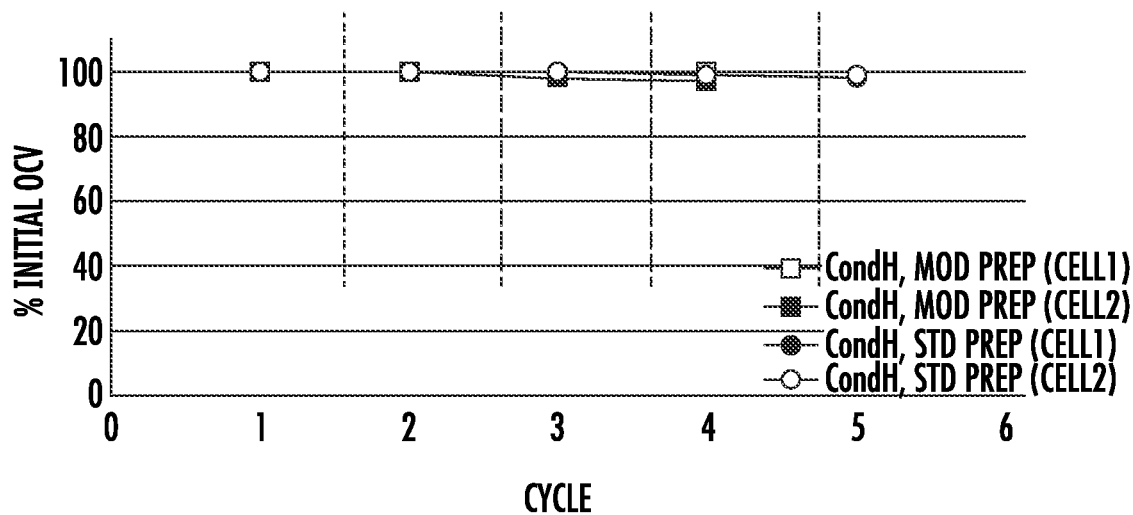
FIG. 11 is a graph showing an OCV percentage of a fuel cell stack with nickel/yttria stabilized zirconia anodes during redox cycling.
Figure 12:
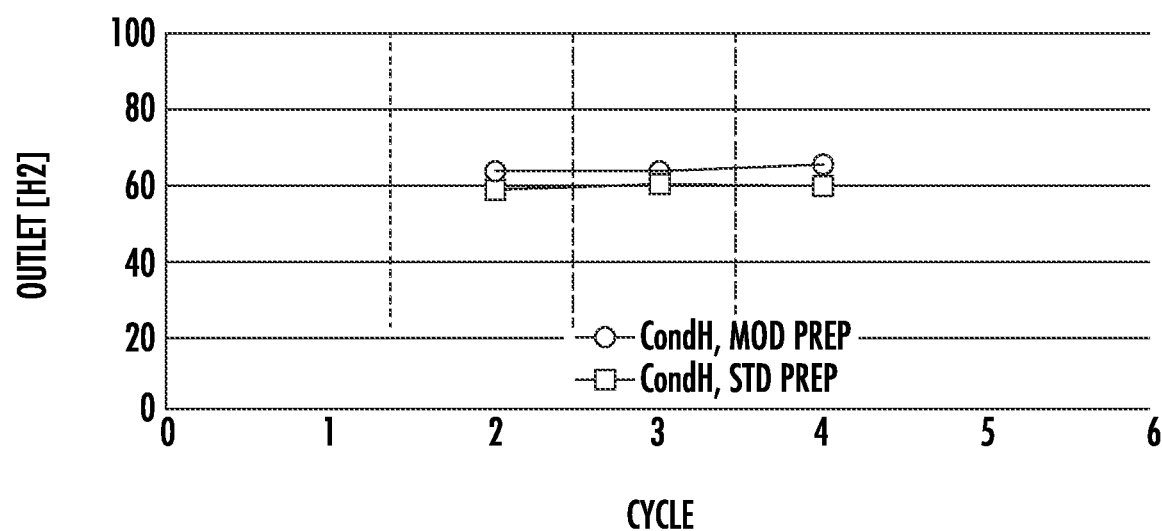
FIG. 12 is a graph showing a hydrogen stack output percentage of a fuel cell stacks with lanthanum strontium titanate/gadolinia-doped ceria anodes during redox cycling.

The results are shown in FIGS. 11 and 12, wherein the x-axis represents a cycle number and the y-axis represents an open circuit voltage of the cycle relative to a baseline OCV (FIG. 11) or an amount of Hydrogen at an outlet (FIG. 12). The first vertical line to the right of the y-axis represents thermal cooling with protective hydrogen flow. The subsequent vertical lines represent the thermal cooling under redox stress conditions. Referring particularly to FIG. 11, when cooling was conducted with protective hydrogen flow, the subsequent OCV was 100% of baseline (cycle 1). Cooling under redox stress the subsequent OCV was about 100% of baseline. Moreover, referring particularly to FIG. 12, a stack outlet showed no reduction in hydrogen gas percentage at OCV after the redox stress cooling cycle as compared the hydrogen gas percentage at OCV after thermal cooling with protective hydrogen flow.

In such a manner, it will be appreciated that these EXAMPLES show the benefits of an operationally stable fuel cell (e.g., of an operationally stable fuel cell stack), in that the fuel cell may withstand redox stress conditions without experiencing a failure, or appreciable depreciation in OCV of hydrogen content at an outlet of the fuel cell. Further benefits are achievable based on this operational stability when the fuel cell (and fuel cell stack and fuel cell assembly) is incorporated into an aviation engine, as described herein.

Figure 13:
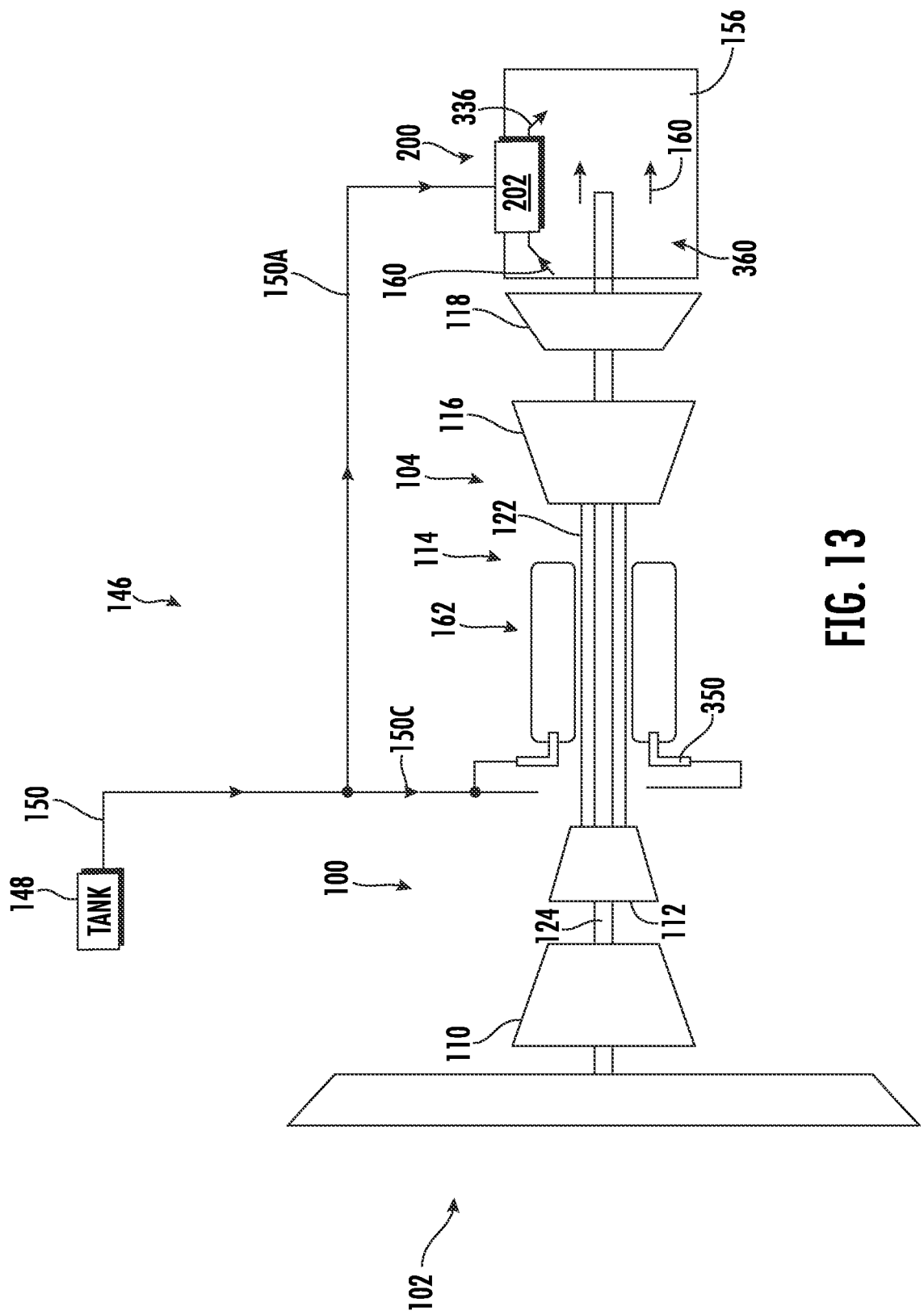
FIG. 13 is a schematic diagram of a gas turbine engine including a fuel cell assembly in accordance with another exemplary aspect of the present disclosure.

Referring now to FIG. 13, a gas turbine engine 100 and fuel cell assembly 200 in accordance with another exemplary embodiment of the present disclosure is provided. The exemplary gas turbine engine 100 and fuel cell assembly 200 depicted in FIG. 13 may be configured in substantially the same manner as the exemplary gas turbine engine 100 and fuel cell assembly 200 described above with reference to, e.g., FIG. 4, and accordingly the same or similar numbers may refer to the same or similar parts.

For example, in the embodiment of FIG. 13, the gas turbine engine 100 generally includes a rotor assembly 102 and a turbomachine 104 having an LP compressor 110, an HP compressor 112, a combustion section 114, an HP turbine 116, and an LP turbine 118. Further, the turbomachine 104 includes an exhaust nozzle 156 defining a primary exhaust gas flowpath 360 having an exhaust gas flow 160 therethrough during operation. Moreover, a fuel delivery system 146 is provided having a fuel source 148, a first fuel line 150A extending from the fuel source 148 to the fuel cell assembly 200, and a third fuel line 150C extending from the fuel source 148 to the combustion section 114 of the turbomachine 104.

In addition, for the exemplary embodiment depicted, the fuel cell assembly 200 includes a fuel cell 202 positioned aft of a combustor 162 of the combustion section 114 and in communication with the exhaust gas flow 160 through the primary exhaust gas flowpath 360 of the exhaust nozzle 156 during operation of the gas turbine engine 100. Although a single fuel cell 202 is depicted schematically in FIG. 13, it will be appreciated that the fuel cell 202 is one of a plurality of fuel cells 202 of a fuel cell stack 204 of the fuel cell assembly 200 (see, e.g., FIG. 2).

Notably, however, for the embodiment of FIG. 13, the fuel cell 202 is configured to provide substantially all output products 336 from the fuel cell 202 during operation of the fuel cell assembly 200 directly to the exhaust gas flow 160 through the exhaust nozzle 156. More specifically, the fuel cell 202 is configured to provide substantially all output products 336 from the fuel cell 202 to the exhaust gas flow 160 without any material alteration of the output products 336. In such a manner, it will be appreciated that the output products 336 are not configured to be processed by, e.g., a reformer prior to being provided to the exhaust gas flow 160. As used herein, the term "substantially all" refers to at least 75%, such as at least 85%, such as at least 90%, such as at least 95%, and up to 100%.

In such a manner, it will be appreciated that the exemplary fuel cell assembly 200 of FIG. 13 may be configured to operate the fuel cell assembly 200 close to 100% fuel utilization to minimize a hydrogen gas composition within the output products 336 provided to the exhaust gas flow 160.

Figure 14:
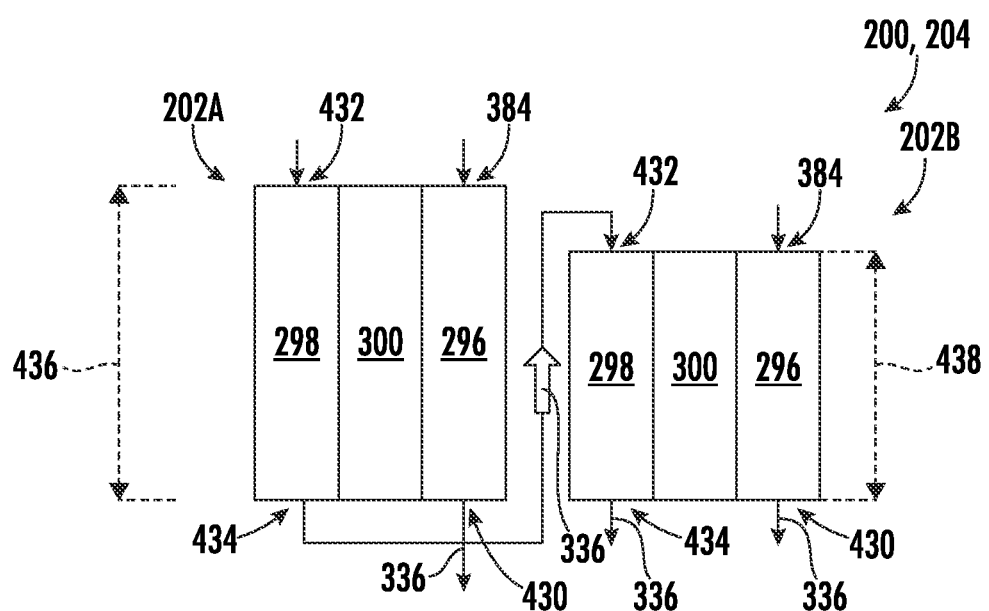
FIG. 14 is a close-up schematic view of a fuel cell stack of a fuel cell assembly in accordance with an exemplary aspect of the present disclosure.

In particular, referring now to FIG. 14, a fuel cell stack 204 is depicted schematically in accordance with an exemplary aspect of the present disclosure. The exemplary fuel cell stack 204 of FIG. 14 may be incorporated into a fuel cell assembly 200, such as the exemplary fuel cell assembly 200 of FIG. 13 described above.

The fuel cell stack 204 includes a first fuel cell 202A and a second fuel cell 202B. The first fuel cell 202A and the second fuel cell 202B each includes a cathode 296 defining a cathode inlet 384 and a cathode outlet 430 (or cathode exhaust), an anode 298 defining an anode inlet 432 and an anode outlet 434 (or anode exhaust), and an electrolyte layer 300 positioned between the respective anode 298 and cathode 296. In the embodiment of FIG. 14, the cathode inlets 384 of the first fuel cell 202A and of the second fuel cell 202B may each be in flow communication with an exhaust gas flow 160 through an exhaust nozzle 156 of the turbomachine 104 (see, e.g., FIG. 13).

The anode inlet 432 of the first fuel cell 202A may be in fluid communication with a fuel line 150 for (FIG. 13) receiving a flow of fuel. However, for the embodiment shown, the second fuel cell 202B is in series flow communication with the first fuel cell 202A at a location downstream of the first fuel cell 202A. In particular, the anode inlet 432 of the second fuel cell 202B is in fluid communication with the anode outlet 434 of the first fuel cell 202A for receiving output products 336 from the anode of the first fuel cell 202A. The anode outlet 434 of the second fuel cell 202B is in fluid communication with the exhaust gas flow 160 through the exhaust nozzle 156 of the turbomachine 104.

In such a manner, the second fuel cell 202B may utilize any residual hydrogen gas within the output products 336 from the anode 298 of the first fuel cell 202A, reducing or eliminating a hydrogen gas composition within the output products 336 provided to the exhaust gas flow 160 (FIG. 13) through the exhaust nozzle 156 (FIG. 13) of the turbomachine 104 (FIG. 13).

It will be appreciated that although two fuel cells are depicted in series flow communication in FIG. 14, in other embodiments, any other suitable number of fuel cells 202 may be arranged in a similar series flow communication (e.g., three or more).

In addition, it will be appreciated that the first fuel cell 202A and the second fuel cell 202B define varying geometries. As used herein, the term "geometry" as it relates to a fuel cell may refer to a physical size of the fuel cell (e.g., length, width, height, etc.), a shape of the fuel cell (e.g., planar, linear, conical, etc.), a physical attribute of a component of the fuel cell (e.g., a porosity of an electrolyte later), or a combination thereof.

In particular, the second fuel cell 202B is smaller than the first fuel cell 202A in the embodiment of FIG. 14. As used herein, the size of a fuel cell refers to a physical size of the fuel cell, a power rating of the fuel cell, or both.

More specifically, in the embodiment of FIG. 14, the first fuel cell 202A defines a first flow height 436, and the second fuel cell 202B defines a second flow height 438. The second flow height 438 is less than the first flow height 436 such that a physical size of the second fuel cell 202B is different than a physical size of the first fuel cell 202A. The term "flow height" refers to a length of the electrolyte layer 300 of the fuel cell along a flow direction of the fuel and air through the fuel cell. It will be appreciated that a size of the second fuel cell 202B (i.e., the downstream fuel cell in the embodiment shown) may be smaller due to a reduced amount of hydrogen gas within the fuel provided to the anode 298 of the second fuel cell 202B.

Moreover, for the embodiment of FIG. 14, the electrolyte layer 300 of the first fuel cell 202A defines a first porosity P1 and the electrolyte layer 300 of the second fuel cell 202B defines a second porosity P2. In the embodiment of FIG. 14, the second porosity P2 is greater than the first porosity P1. In such a manner, the second fuel cell 202B may be capable of an increased fuel utilization, to further reduce a hydrogen gas composition of output products 336 provided from the anode outlet 434 of the second fuel cell 202B to the exhaust gas flow 160 (FIG. 13) of the exhaust nozzle 156 (FIG. 13).

It will be appreciated from the description herein, that the present disclosure may further include one or more methods of operating a gas turbine engine.

Figure 15:
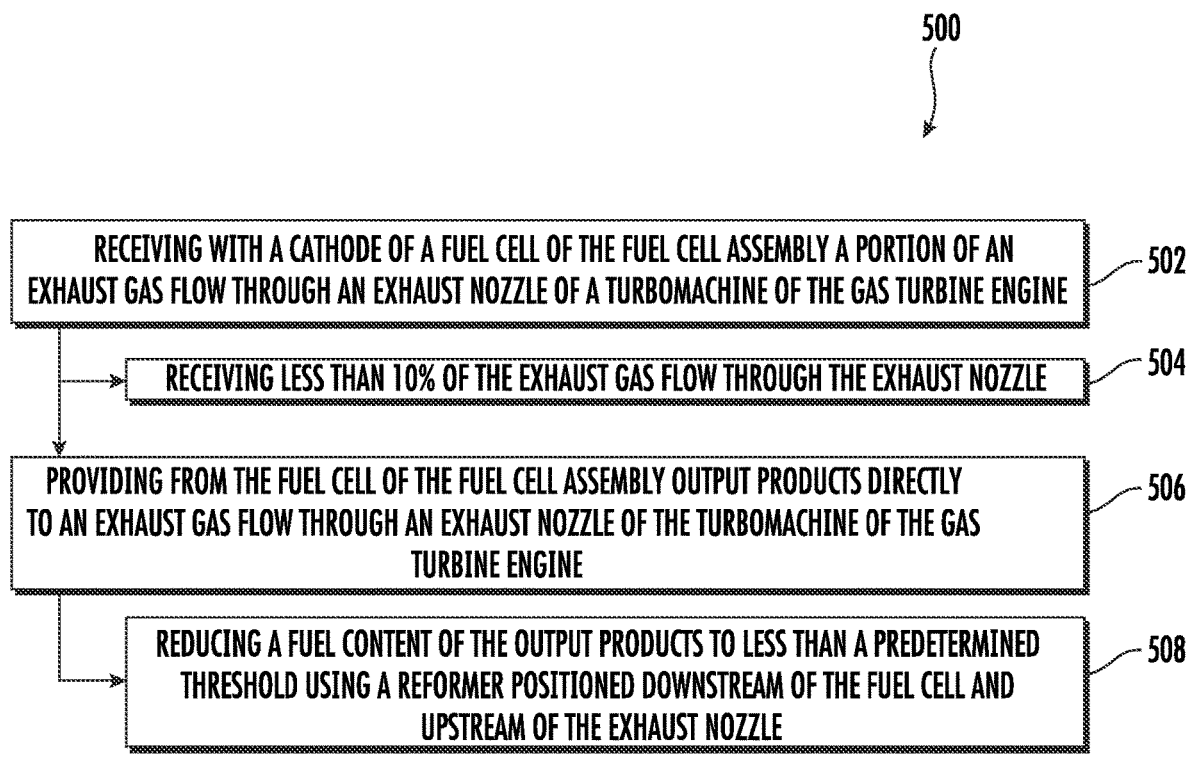
FIG. 15 is a flow diagram of a method of operating a gas turbine engine having a fuel cell assembly in accordance with an exemplary aspect of the present disclosure.

For example, referring briefly to FIG. 15, a method 500 of operating a gas turbine engine having a fuel cell assembly is provided. The method 500 includes at (502) receiving with a cathode of a fuel cell of the fuel cell assembly a portion of an exhaust gas flow through an exhaust nozzle of a turbomachine of the gas turbine engine. Receiving the portion of the exhaust gas flow at (502) more specifically includes at (504) receiving less than 10% of the exhaust gas flow through the exhaust nozzle.

Further, for the exemplary embodiment depicted, the method 500 includes at (506) providing from the fuel cell of the fuel cell assembly output products directly to an exhaust gas flow through an exhaust nozzle of the turbomachine of the gas turbine engine.

In the exemplary aspect depicted, providing the output products directly to the exhaust gas flow at (506) more specifically includes at (508) reducing a fuel content of the output products to less than a predetermined threshold using a reformer positioned downstream of the fuel cell and upstream of the exhaust nozzle. The predetermined threshold may be a predetermined carbon monoxide threshold, a predetermined hydrogen gas threshold, a predetermined methane ($CH_4$) gas threshold, or a predetermined ethane ($C_2H_6$) gas threshold.

Inclusion of a fuel cell assembly 200 without a reformer or fuel recycle assembly, and/or operating a fuel cell assembly in accordance with one or more exemplary aspects of the present disclosure as discussed above, may allow for a simpler integration of the fuel cell assembly 200 within a gas turbine engine.

Figure 16:
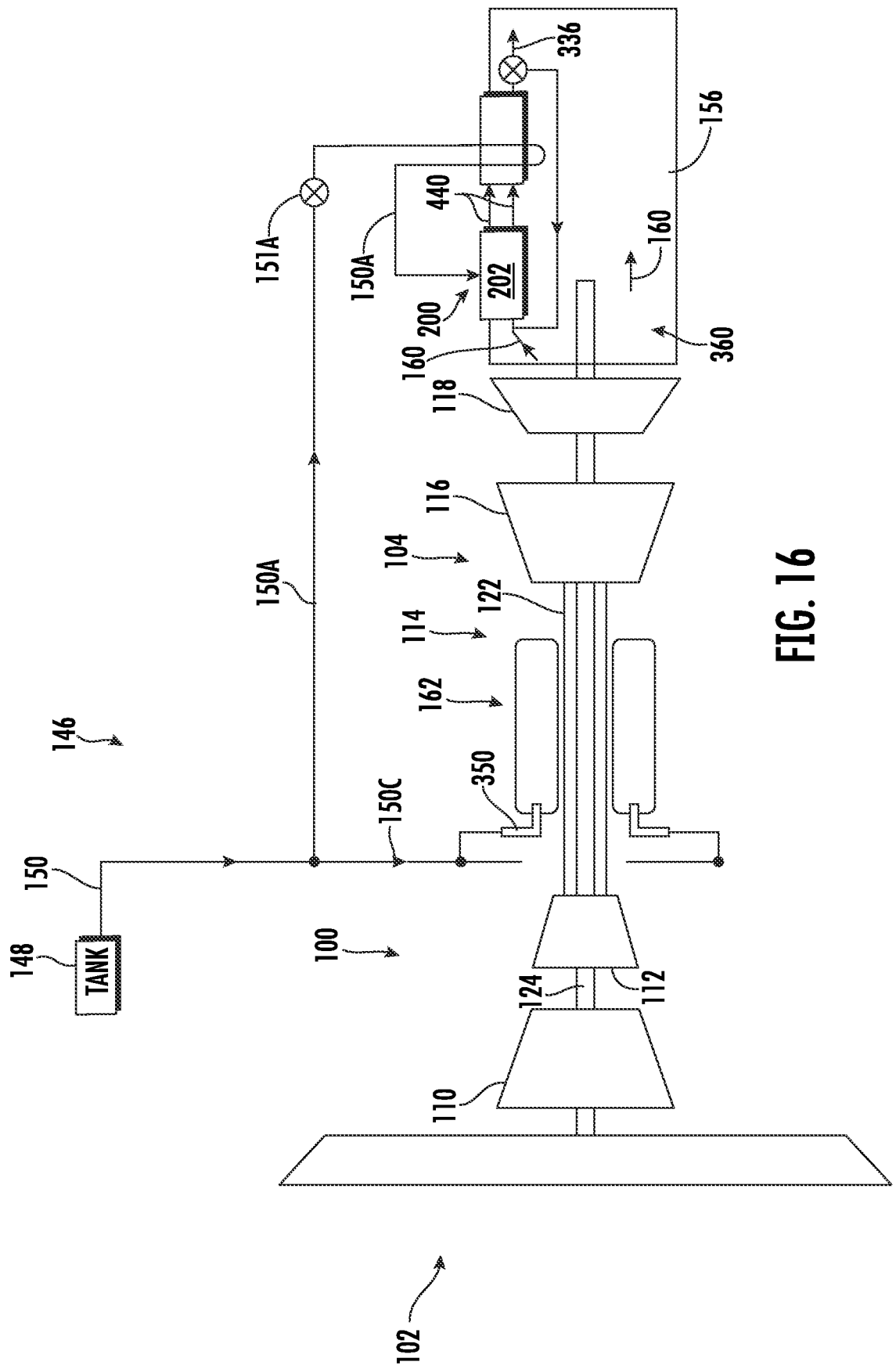
FIG. 16 is a schematic diagram of a gas turbine engine including a fuel cell assembly in accordance with another exemplary aspect of the present disclosure.

Referring now to FIG. 16, a gas turbine engine 100 and a fuel cell assembly 200 in accordance with another exemplary embodiment of the present disclosure is provided. The exemplary gas turbine engine 100 and fuel cell assembly 200 depicted in FIG. 16 may be configured in substantially the same manner as exemplary gas turbine engine 100 and fuel cell assembly 200 described above with reference to FIG. 13, and accordingly the same or similar numbers may refer to the same or similar parts.

For example, in the embodiment of FIG. 16, the gas turbine engine 100 generally includes a rotor assembly 102 and a turbomachine 104 having an LP compressor 110, an HP compressor 112, a combustion section 114, an HP turbine 116, and an LP turbine 118. Further, the turbomachine 104 includes an exhaust nozzle 156 defining a primary exhaust gas flowpath 360 having an exhaust gas flow 160 therethrough during operation. Moreover, a fuel delivery system 146 is provided having a fuel source 148, a first fuel line 150A extending from the fuel source 148 to the fuel cell assembly 200 and a third fuel line 150C extending from the fuel source 148 to the combustion section 114 of the turbomachine 104.

In addition, for the exemplary embodiment depicted, the fuel cell assembly 200 includes a fuel cell 202 positioned aft of a combustor 162 of the combustion section 114 and in communication with the exhaust gas flow 160 through the primary exhaust gas flowpath 360 of the exhaust nozzle 156 during operation of the gas turbine engine 100. Although a single fuel cell 202 is depicted schematically in FIG. 16, it will be appreciated that the fuel cell 202 is one of a plurality of fuel cells 202 of a fuel cell stack 204 of the fuel cell assembly 200 (see, e.g., FIG. 2).

As with the embodiment of FIG. 13, the exemplary fuel cell assembly 200 of FIG. 16 is configured to provide substantially all of the output products 336 from the fuel cell 202 of the fuel cell assembly 200 to the exhaust gas flow 160 of the exhaust nozzle 156 of the turbomachine 104.

However, it will be appreciated that the exemplary fuel cell assembly 200 of FIG. 16 further includes an output products line 440 in fluid communication with an outlet of the fuel cell 202 receiving output products 336 from the fuel cell 202. The first fuel line 150A is positioned to be in thermal communication with the output products 336 through the output products line 440 during operation of the gas turbine engine 100. In such a manner, the output products 336 of the fuel cell 202 of the fuel cell assembly 200 may be utilized to preheat a fuel flow to be provided to the fuel cell assembly 200. Such may, e.g., vaporize the fuel flow through the first fuel line 150A and reduce an amount of necessary reactions within the fuel cell 202.

Figure 17:
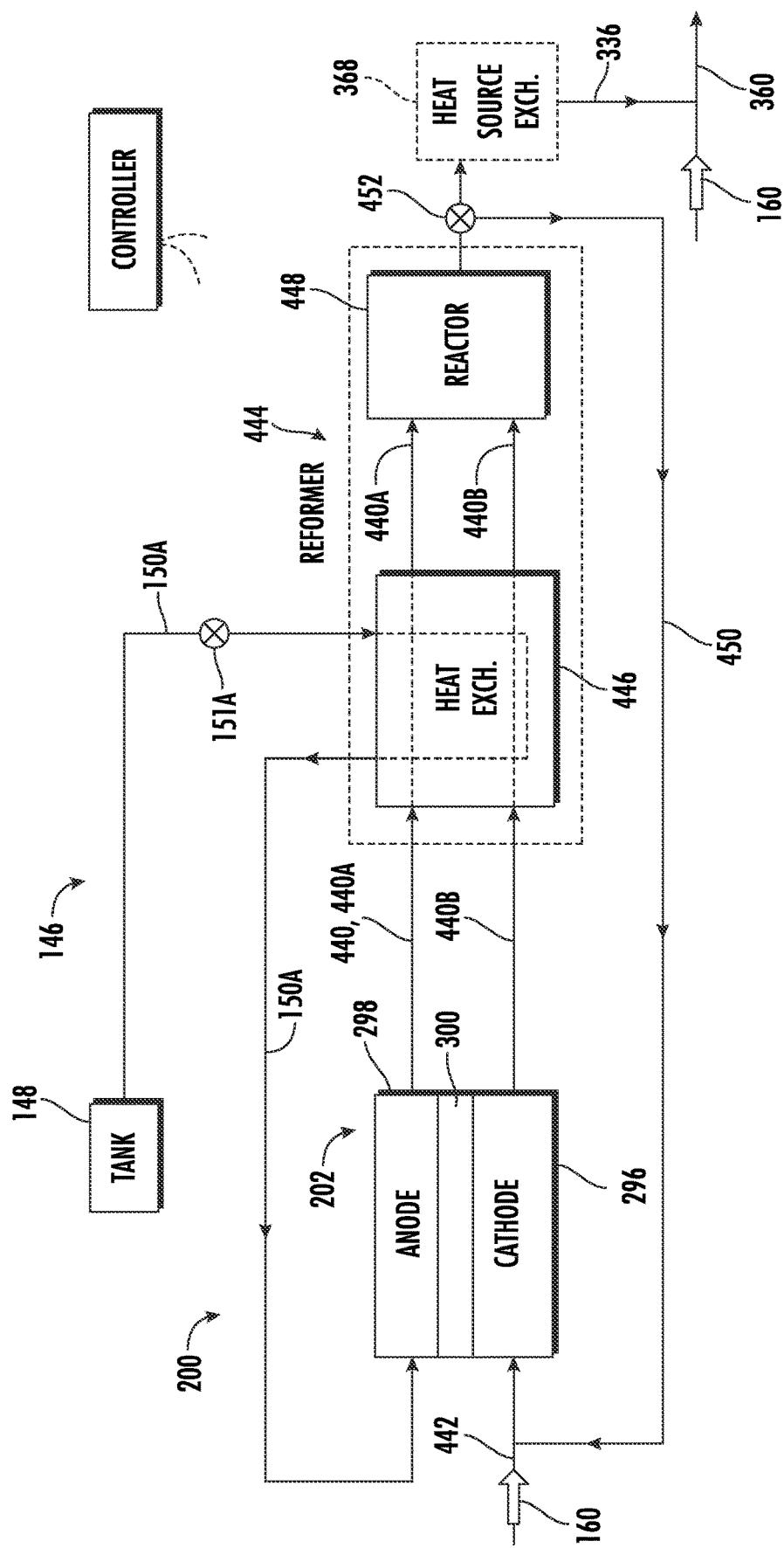
FIG. 17 is a close up, schematic view of a fuel cell and reformer in accordance with an exemplary aspect of the present disclosure.

More specifically, referring now to FIG. 17, a schematic, close up view is depicted of the embodiment of FIG. 16, focusing particularly on the fuel cell assembly 200.

In particular, it will be appreciated that the fuel cell 202 of the fuel cell assembly 200 of FIG. 17 includes an anode 298, a cathode 296, and an electrolyte layer 300 positioned between the anode 298 and the cathode 296. The anode 298 is in fluid communication with the first fuel line 150A for receiving a fuel flow from the first fuel line 150A. The cathode 296 is in fluid communication with an exhaust gas flow 160 for receiving a portion of the exhaust gas flow 160. Depicted schematically is a cathode inlet line 442 for providing the portion of the exhaust gas flow 160 to the cathode 296 of the fuel cell 202.

In addition, the exemplary fuel cell assembly 200 depicted in FIG. 17 further includes a reformer 444 in fluid communication with the output products line 440, i.e., downstream of the outlet of the fuel cell 202 and upstream of the exhaust gas flow 160, or rather upstream of a location where the output products 336 are introduced to the exhaust gas flow 160. More particularly, for the embodiment shown, the output products line 440 includes an anode output products line 440A and a cathode output products line 440B. The reformer 444 is in fluid communication with both the anode output products line 440A and the cathode output products line 440B. The first fuel line 150A is in thermal communication with the reformer 444 for accepting heat from the output products 336 through the cathode output products line 440B, through the anode output products line 440A, or, as in the embodiment shown, both. In particular, for the embodiment shown, the reformer 444 is a two-stage reformer 444. More specifically, the reformer 444 includes a first stage and a second stage. The first stage of the reformer 444 is in thermal communication with the first fuel line 150A and the second stage is configured to reduce a hydrogen gas content of the output products 336 provided thereto from the output products line 440.

More specifically, the first stage of the reformer 444 is configured as a heat exchanger 446 configured to receive output products 336 through the anode output products line 440A and output products 336 through the cathode output products line 440B, as well as a fuel flow through the first fuel line 150A. The first stage of the reformer 444 may transfer heat from one or both of the output products 336 through the anode output products line 440A and the cathode output products line 440B to the fuel flow from the first fuel line 150A. In at least certain exemplary aspects, the first stage of the reformer 444 may be configured to vaporize the fuel flow through the first fuel line 150A.

As will be appreciated, the fuel delivery system 146 includes a fuel flow valve, and more specifically a first fuel valve 151A, at a location upstream of the heat exchanger 446 to control a fuel flow through the first fuel line 150A. In such a manner, the first fuel valve 151A may not be exposed to the fuel at the relatively high temperature downstream of the heat exchanger 446, providing longevity benefits to the first fuel valve 151A.

The second stage of the reformer 444 may be configured as a reactor 448 operable to reduce or eliminate a hydrogen gas composition in the output products 336. The reactor 448 may be configured as, e.g., a catalytic fuel oxidizer, a burner, or any other chemical reactor capable of oxidizing a fuel within the output products 336. In particular, the reactor 448 may be configured as a tail gas oxidizer (TGO). The TGO may generally include a chamber in which the output products 336 from the anode 298 is oxidized by reaction with an oxidizer stream, such as a reaction of the output products 336 from the anode 298 with output products 336 from the cathode 296. The TGO chamber walls may be coated with a suitable oxidation reaction promoting catalyst, such as nickel. The oxidation reaction may release heat.

The output products 336 may be provided from the heat exchanger 446 to the reformer 444 (through the anode output products line 440A and the cathode output products line 440B), and from the reformer 444 to the exhaust gas flow 160. The reactor 448 may reduce or eliminate a fuel content within the flow of output products 336, such that a fuel composition in the flow through the reformer 444 is reduced to less than a predetermined threshold. The predetermined threshold may be a predetermined carbon monoxide threshold, a predetermined hydrogen gas threshold, a predetermined methane ($CH_4$) gas threshold, or a predetermined ethane ($C_2H_6$) gas threshold.

Notably, in the embodiment depicted, a heat source exchanger 368 may be provided in thermal communication with the output products 336 downstream of the reformer 444 and upstream of the exhaust gas flow 160. The heat source exchanger 368 depicted may be configured to receive substantially exclusively flow from the reformer 444 and may capture the heat released by the oxidation in the reactor 448.

Further, in the embodiment depicted, the fuel cell assembly 200 further includes a recirculation line 450 extending from the reformer 444 to the fuel cell 202, and more specifically for the embodiment shown, extending from a location downstream of the reformer 444 to the fuel cell 202 for providing a flow from the reformer 444 to the fuel cell 202. A recirculation valve 452 is provided for regulating the flow through the recirculation line 450.

In particular, the recirculation line 450 extends from the reformer 444 (or downstream of the reformer 444) to a location upstream of the fuel cell 202 to provide the flow to the cathode 296 of the fuel cell 202. More specifically, still, for the embodiment depicted, the flow is provided to the cathode inlet line 442. The flow may be merged with the exhaust gas flow 160 provided through the cathode inlet line 442 to the fuel cell 202. The flow from downstream of the reformer 444 may act to increase an average temperature of the flow provided to the cathode 296 of the fuel cell 202 for, e.g., temperature management purposes.

It will be appreciated that the exemplary fuel cell 202 and reformer 444 of FIG. 17 is provided by way of example only, and that in other exemplary aspects of the present disclosure the fuel cell assembly 200 may have any other suitable configuration. For example, referring now to FIG. 18, a close-up, schematic view of a fuel cell assembly 200 in accordance with an exemplary aspect of the present disclosure is provided. The fuel cell assembly 200 of FIG. 18 may be configured in substantially the same manner as the exemplary fuel cell assembly 200 of FIG. 17. However, for the embodiment of FIG. 18, a cathode inlet line 442 (providing a portion of an exhaust gas flow 160 to a cathode 296 of a fuel cell 202 of the fuel cell assembly 200) is in thermal communication with a reformer 444 of the fuel cell assembly 200 at a location upstream of an inlet to the cathode 296 of the fuel cell 202.

Figure 18:
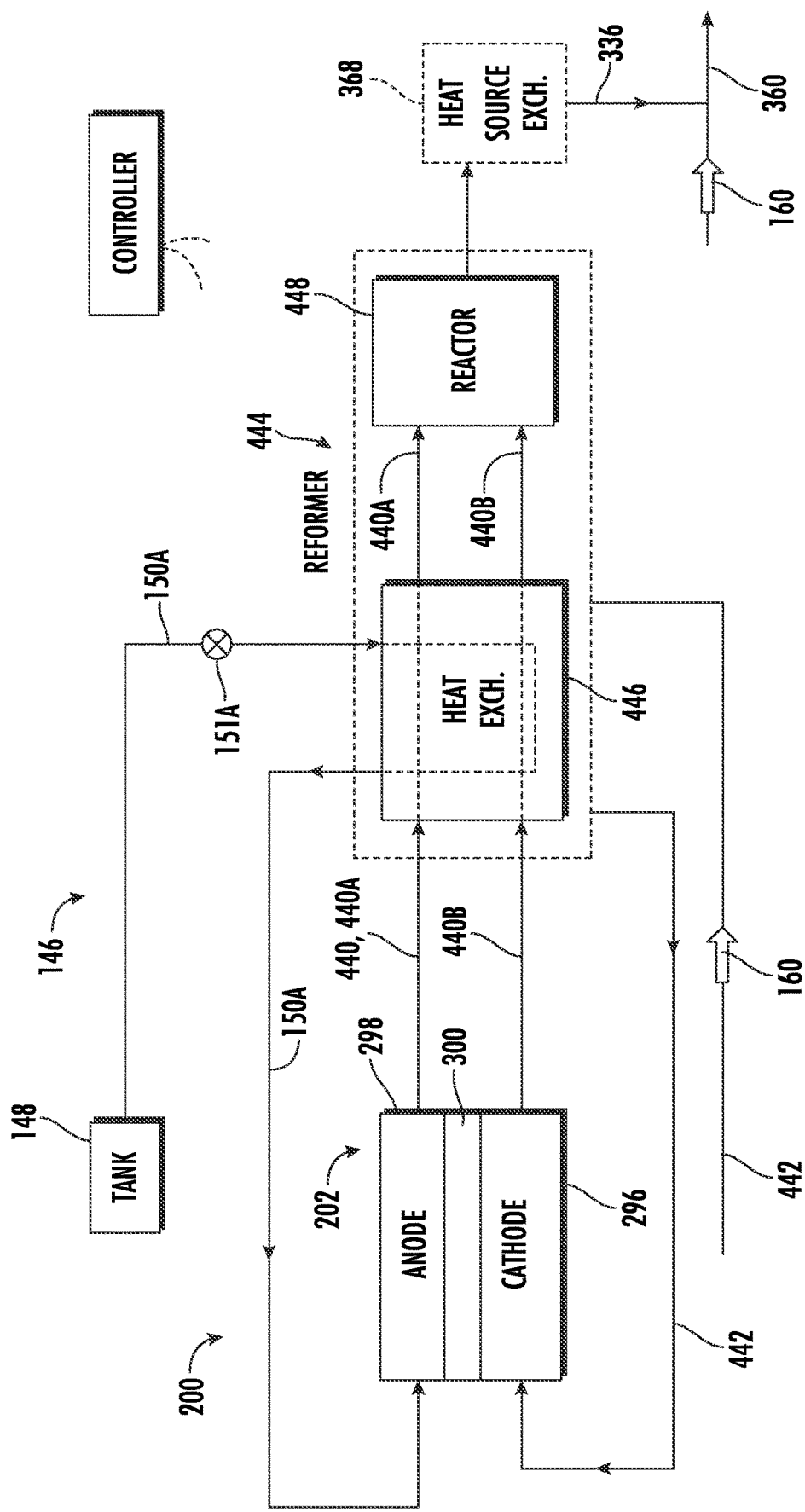
FIG. 18 is a close up, schematic view of a fuel cell and reformer in accordance with another exemplary aspect of the present disclosure.

In such a manner, it will be appreciated that for the embodiment of FIG. 18, an inlet line configured to provide an air flow to the fuel cell 202 (i.e., the cathode inlet line 442 for the embodiment shown) is positioned to be in thermal communication with the output products 336 during operation of the gas turbine engine, and more specifically is configured to be in thermal communication with the output products 336 through a thermal connection with the reformer 444.

It will be appreciated from the description herein, that the present disclosure may further include one or more methods of operating a gas turbine engine.

Figure 19:
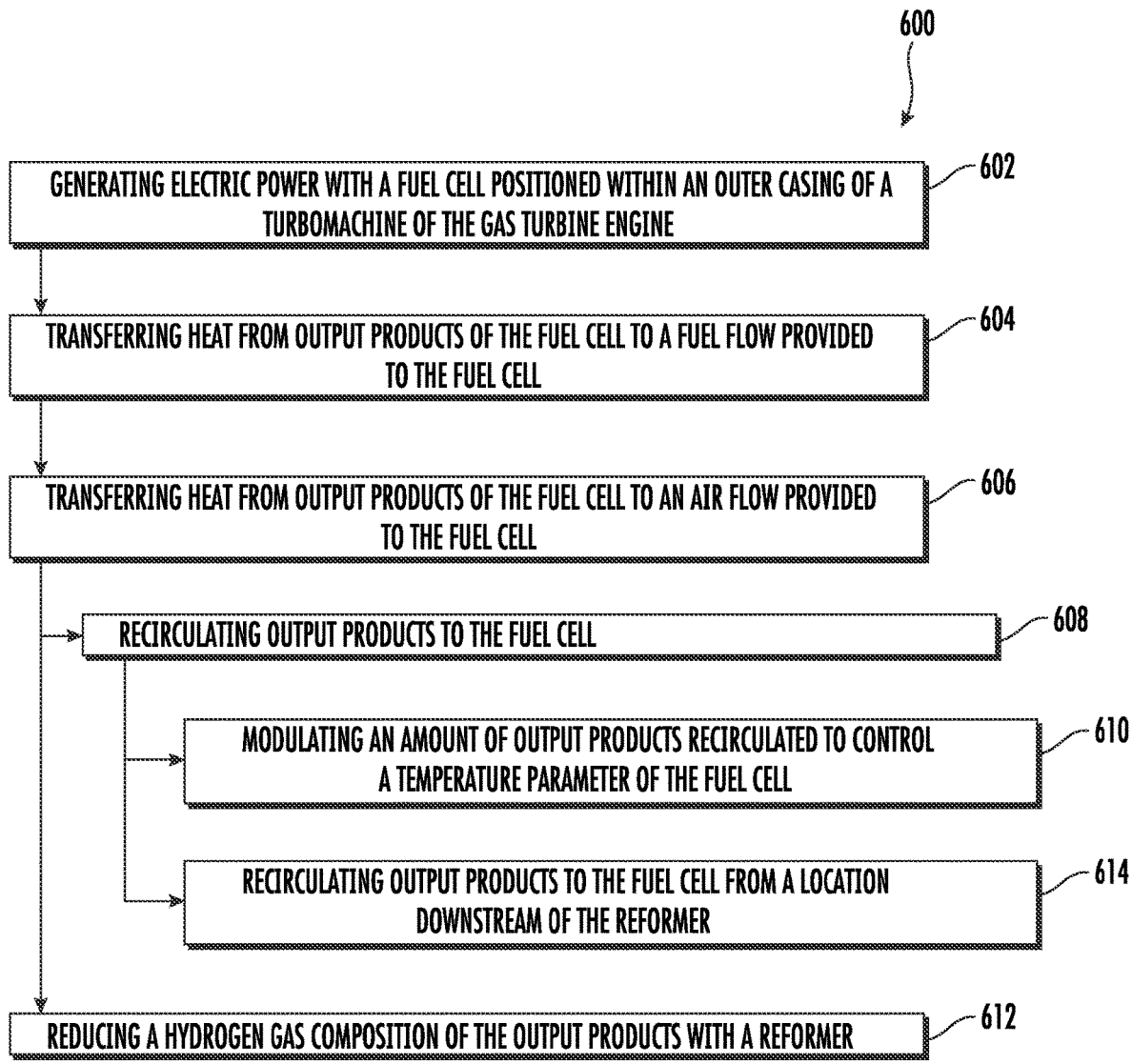
FIG. 19 is a flow diagram of a method of operating a gas turbine engine having a fuel cell assembly in accordance with an exemplary aspect of the present disclosure.

For example, referring now to FIG. 19, a method 600 of operating a gas turbine engine is provided. The method 600 includes at (602) generating electric power with a fuel cell positioned within an outer casing of a turbomachine of the gas turbine engine, and at (604) transferring heat from output products of the fuel cell to a fuel flow provided to the fuel cell.

The method 600 further includes at (606) transferring heat from output products of the fuel cell to an air flow provided to the fuel cell. More specifically, transferring heat from output products of the fuel cell to the air flow provided to the fuel cell at (606) includes at (608) recirculating output products to the fuel cell. More specifically, still, recirculating output products to the fuel cell at (608) includes at (610) modulating an amount of output products recirculated to control a temperature parameter of the fuel cell (e.g., based on a temperature setpoint for an airflow to the fuel cell).

Moreover, the method 600 includes at (612) reducing a hydrogen gas composition of the output products with a reformer. With such an exemplary aspect, and wherein recirculating output products to the fuel cell at (608) more specifically includes at (614) recirculating output products to the fuel cell from a location downstream of the reformer.

It will be appreciated that the exemplary aspect of the method 600 depicted in FIG. 19 may allow for more efficient operation of the fuel cell assembly and/or gas turbine engine by transferring the heat from the output products to the fuel flow (and/or air flow) as useful work.

Notably, however, it will be appreciated that the method 600 is provided by way of example only, and that in other exemplary aspects, the method 600 may include any other additional or alternative aspects.

Figure 20:
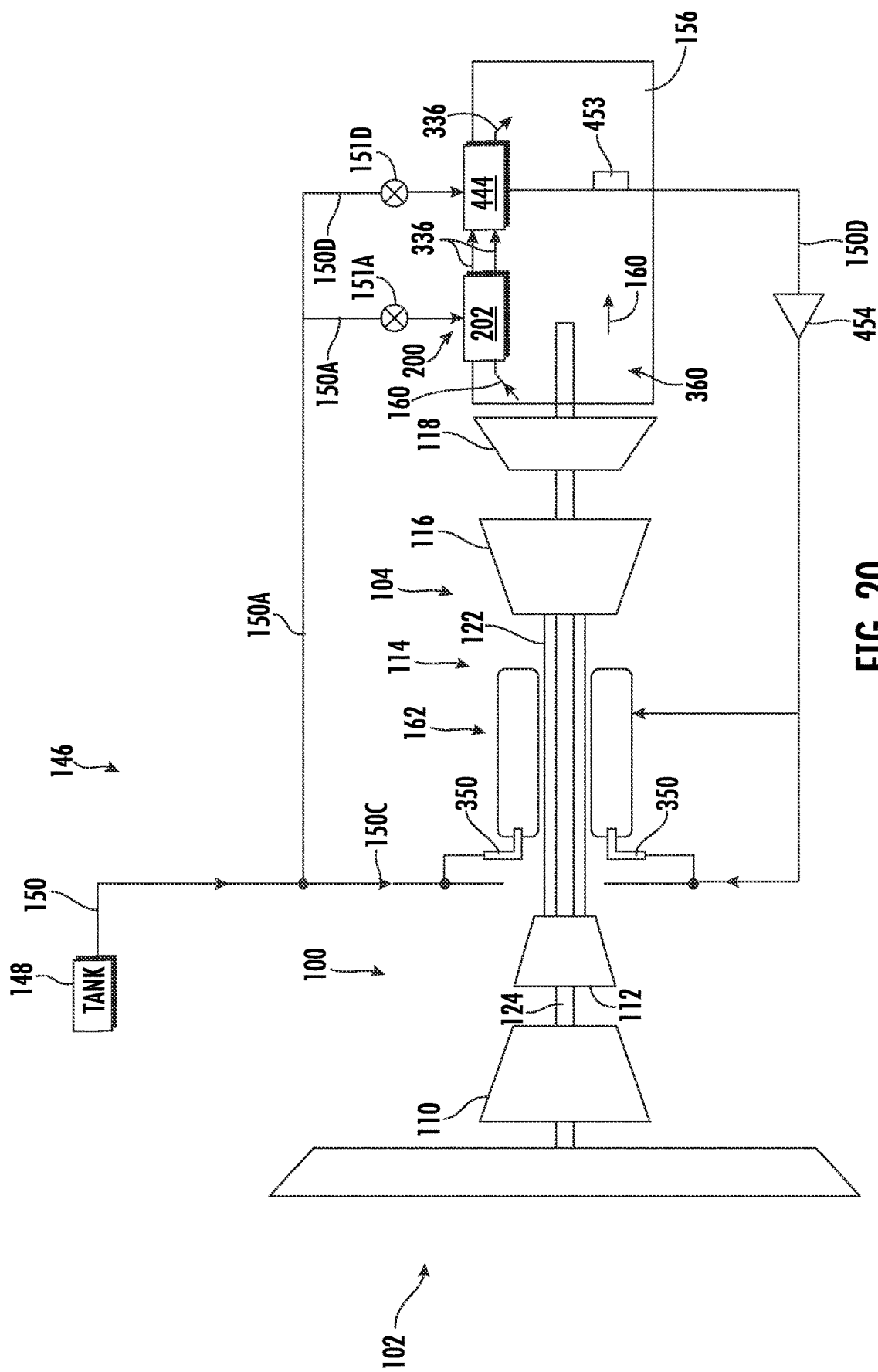
FIG. 20 is a schematic diagram of a gas turbine engine including a fuel cell assembly in accordance with another exemplary aspect of the present disclosure.

Referring now to FIG. 20, a gas turbine engine 100 and a fuel cell assembly 200 in accordance with another exemplary embodiment of the present disclosure is provided. The exemplary gas turbine engine 100 and fuel cell assembly 200 depicted in FIG. 20 may be configured in substantially the same manner as the exemplary gas turbine engine 100 and fuel cell assembly 200 described above with reference to, e.g., FIG. 16, and accordingly the same or similar numbers may refer to the same or similar parts.

For example, in the embodiment of FIG. 20, the gas turbine engine 100 generally includes a rotor assembly 102 and a turbomachine 104 having an LP compressor 110, an HP compressor 112, a combustion section 114, an HP turbine 116, and an LP turbine 118. Further, the turbomachine 104 includes an exhaust nozzle 156 defining a primary exhaust gas flowpath 360 having an exhaust gas flow 160 therethrough during operation. Moreover, a fuel delivery system 146 is provided having a fuel source 148, a first fuel line 150A extending from the fuel source 148 to the fuel cell assembly 200, and a third fuel line 150C extending from the fuel source 148 to the combustion section 114 of the turbomachine 104.

As will be described in more detail, below, the fuel delivery system 146 further includes a fourth fuel line 150D.

In addition, for the exemplary embodiment depicted, the fuel cell assembly 200 includes a fuel cell 202 positioned aft of a combustor 162 of the combustion section 114 and in communication with the exhaust gas flow 160 through the primary exhaust gas flowpath 360 of the exhaust nozzle 156 during operation of the gas turbine engine 100. Although a single fuel cell 202 is depicted schematically in FIG. 20, it will be appreciated that the fuel cell 202 is one of a plurality of fuel cells 202 of a fuel cell stack 204 of the fuel cell assembly 200 (see, e.g., FIG. 2).

In the embodiment shown, the fuel cell assembly 200 is depicted without a fuel processing unit located upstream of the fuel cell 202 along the first fuel line 150A. In such a manner, the fuel cell 202 may include a redox stable anode, as described above with reference to FIGS. 9 through 12.

Alternatively, in other embodiments, a separate fuel processing unit may be provided (see FIG. 3). Additionally, or alternatively, the fuel cell 202 may be configured to receive a hydrogen rich gas from another source (such as is described below).

As will be appreciated, the fuel cell 202 is configured to receive the fuel flow through the first fuel line 150A in the embodiment depicted and is further configured to receive a portion of the exhaust gas flow 160 through the primary exhaust gas flowpath 360 of the exhaust nozzle 156. The fuel cell 202 may generate electricity with such flows.

Referring still to the embodiment of FIG. 20, the fuel cell assembly 200 depicted further includes a reformer 444. The reformer 444 is in communication with a fuel line 150 of the fuel delivery system 146 and the output products 336 from the fuel cell 202 during operation of the gas turbine engine 100. Using the output products 336 from the fuel cell 202 during operation gas turbine engine 100, the reformer 444 is configured to convert a fuel flow through the fuel line 150 to a hydrogen rich gas.

As briefly mentioned above, the fuel delivery system 146 further includes the fourth fuel line 150D. The reformer 444 is more specifically in communication with the fourth fuel line 150D, and the fourth fuel line 150D is further in fluid communication with the turbomachine 104 at a location upstream of the fuel cell assembly 200. In particular, for the embodiment shown, the fourth fuel line 150D is in fluid communication with the combustion section 114 of the turbomachine 104, and more specifically with a primary fuel nozzle 350 of a combustor 162 of the combustion section 114, as well as a combustion chamber (not labeled) of the combustor 162 at a location downstream of the primary fuel nozzle 350. A heat exchanger 453 and pump 454 are provided in thermal and fluid communication, respectively, with the fourth fuel line 150D for reducing a temperature of the fuel flow therethrough and increasing the pressure of the fuel flow therethrough.

Figure 21:
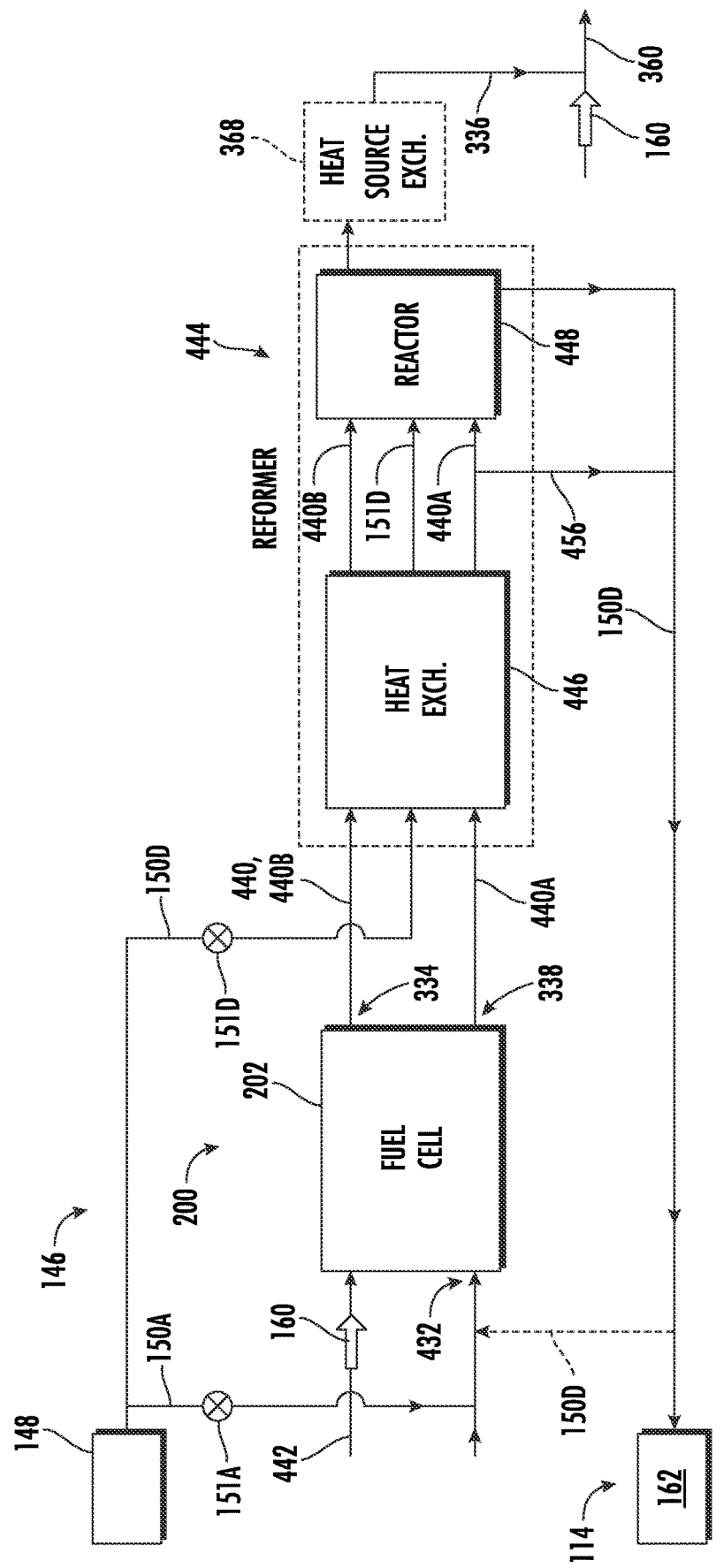
FIG. 21 is a close up, schematic view of a fuel cell and reformer in accordance with an exemplary aspect of the present disclosure.

Referring now to FIG. 21, a close-up, schematic view is depicted of the fuel cell assembly 200 and fuel delivery system 146 described above with reference to FIG. 20.

As shown, the fuel cell 202 is in fluid communication with the exhaust nozzle 156 (FIG. 20) of the turbomachine 104 (FIG. 20) for receiving the exhaust gas flow 160 at a cathode (not shown) of the fuel cell 202. Further, the fuel cell 202 is in fluid communication with the fuel source 148 through the first fuel line 150A for receiving fuel at an anode (not shown) of the fuel cell 202. The fuel cell 202 further defines a cathode exhaust 334 for exhausting output products 336 from the cathode 296 and an anode exhaust 338 for exhausting output products 336 from the anode. In particular, the fuel cell assembly further includes an output products line 440 having an anode output products line 440A extending from the anode exhaust 338 and a cathode output products line 440B extending from the cathode exhaust 334.

As briefly mentioned above, the reformer 444 is in communication with the fourth fuel line 150D of the fuel delivery system 146 and the output products 336 of the fuel cell 202 (via the output products line 440) during operation of the gas turbine engine 100. More specifically, the reformer 444 is in fluid communication with the anode exhaust 338 and the cathode exhaust 334 (via the anode output products line 440A and cathode output products line 440B) for receiving output products 336 from the anode and the cathode of the fuel cell 202, respectively. Further, the reformer 444 is in fluid communication with the fourth fuel line 150D.

More specifically, for the embodiment shown, the reformer 444 is configured as a two-stage reformer 444 having a first stage and a second stage. The first stage of reformer 444 includes a heat exchanger 446 thermally coupling the output products 336 from the fuel cell 202 (via the anode output products line 440A and cathode output products line 440B) with the fuel flow through the fourth fuel line 150D. In such a manner, the heat exchanger 446 of the reformer 444 may be configured to increase a temperature of the fuel flow through the fourth fuel line 150D, e.g., to at least 700 degrees C. and up to 900 degrees C.

Further, for the embodiment shown, the second stage of the reformer 444 includes a reactor 448 configured to convert the fuel flow through the fuel line to hydrogen rich gas. The reactor 448 may use any suitable technology for accomplishing such a conversion. For example, certain exemplary embodiments, there reactor 448 of the reformer 444 may use a steam reforming technology, in which case the reformer 444 may be referred to as a steam reformer. Additionally, or alternatively, the reactor 448 of the reformer 444 may use a partial oxidation reforming technology, such as a catalytic partial oxidation reforming technology. In such a case, the reformer 444 may be referred to as a catalytic partial oxidation reformer.

The fourth fuel line 150D is further and fluid communication with the reactor 448 of the reformer 444 and the location of the turbomachine 104 upstream of the fuel cell 202 of the fuel cell assembly 200 to receive the hydrogen rich gas from the reactor 448 of the reformer 444 and provide the hydrogen rich gas to the location of the turbomachine 104 upstream of the fuel cell 202 of the fuel cell assembly 200. More specifically, a first portion of the fourth fuel line 150D is located upstream of the reformer 444, and a second portion of the fourth fuel line 150D is located downstream of the reformer 444, in fluid communication with the reactor 448 of the reformer 444 and the combustion section 114 for providing the hydrogen rich gas from the reactor 448 of the reformer 444 to the combustion section 114. In such a manner, it will be appreciated that the fourth fuel line 150D, in the embodiment depicted, is in fluid communication with the combustor 162 of the combustion section 114 at a location downstream of the reformer 444.

As will be appreciated, and is depicted in phantom, in other exemplary aspects the fourth fuel line 150D may additionally or alternatively extend to the fuel cell 202 to provide hydrogen rich gas to the fuel cell 202. In particular, the fourth fuel line 150D may extend to an anode inlet 432 to provide the hydrogen rich gas to the anode (not shown) of the fuel cell 202. In such a manner, it will be appreciated that in certain exemplary aspects, the fourth fuel line 150D may be in fluid communication with the fuel cell 202 at a location downstream of the reformer 444.

Notably, the exemplary fuel cell assembly 200 depicted further includes a fuel recirculation line 456 extending from the reformer 444 to the fourth fuel line 150D to recycle output products 336 of the fuel cell 202 containing hydrogen gas. In particular, in the embodiment shown, the fuel recirculation line 456 extends from the reformer 444 at a location downstream of the first stage and upstream of the second stage to the fourth fuel line 150D.

As will be appreciated, in other exemplary aspects (and as is depicted in phantom), the output products 336 from the anode of the fuel cell 202 may be provided from the first stage of the reformer 444 to the second stage of the reformer 444.

Notably, in the embodiment shown, the reformer 444 is positioned to provide the output products 336 from the cathode of the fuel cell 202 to the exhaust gas flow 160 through the exhaust nozzle 156 (not shown in the schematic view depicted) of the turbine section. In the embodiment shown, a heat source exchanger 368 is positioned downstream of the reformer 444 in thermal communication with the output products 336 from the cathode of the fuel cell 202, provided from the reformer 444 to the exhaust gas flow 160 through the exhaust nozzle 156 of the turbine section. In the embodiment shown, the heat source exchanger 368 is positioned to receive substantially exclusively a flow from the reformer 444.

It will be appreciated, however, that the exemplary configuration depicted in FIG. 21 is provided by way of example only. In other exemplary embodiments, for example, the reformer 444 may not be configured to receive both the output products 336 from the cathode of the fuel cell 202 and from the anode of the fuel cell 202, and instead may receive only the output products 336 from the cathode of the fuel cell 202 or only the output products 336 from the anode of the fuel cell 202. Further, although for the embodiment depicted the reactor 448 of the reformer 444 is configured to receive the output products 336 from the cathode of the fuel cell 202 downstream of the heat exchanger 446, in other embodiments, the reactor 448 may not receive such output products 336.

As will be appreciated, inclusion of a fuel cell assembly and fuel delivery assembly in accordance with the exemplary aspect of FIG. 21 may allow for a more efficient conversion process by directly utilizing a relatively high amount of heat generated by the fuel cell of the fuel cell assembly during operation of the fuel cell assembly and gas turbine engine.

It will be appreciated from the description herein, that the present disclosure may further include one or more methods of operating a gas turbine engine.

Figure 22:
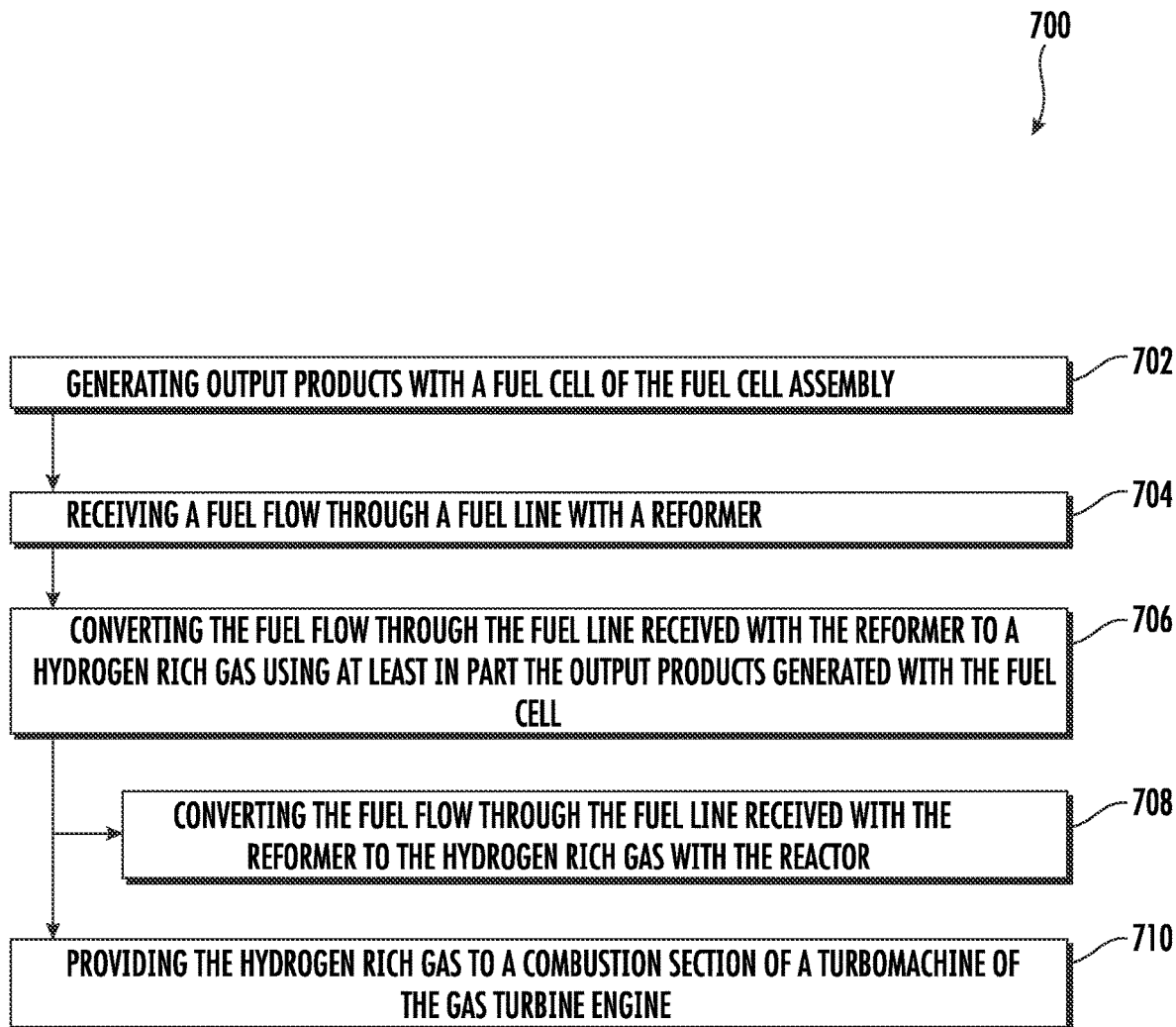
FIG. 22 is a flow diagram of a method of operating a gas turbine engine having a fuel cell assembly in accordance with an exemplary aspect of the present disclosure.

For example, referring now to FIG. 22, a method 700 of operating a fuel cell assembly is provided. The method 700 includes at (702) generating output products with a fuel cell of the fuel cell assembly, at (704) receiving a fuel flow through a fuel line with a reformer, and at (706) converting the fuel flow through the fuel line received with the reformer to a hydrogen rich gas using at least in part the output products generated with the fuel cell.

In particular, for the exemplary aspect of the method 700 depicted in FIG. 22, the reformer includes a reactor in communication with the output products from the fuel cell and the fuel flow. With such an exemplary aspect, converting the fuel flow through the fuel line received with the reformer to the hydrogen rich gas at (706) includes at (708) converting the fuel flow through the fuel line received with the reformer to the hydrogen rich gas with the reactor. The reformer may be a steam reformer or a catalytic partial oxidation reformer.

Moreover, for the exemplary aspect of the method 700 depicted in FIG. 22, the method 700 further includes at (710) providing the hydrogen rich gas to a combustion section of a turbomachine of the gas turbine engine.

It will be appreciated that the exemplary aspect of the method 700 depicted in FIG. 22 may allow for more efficient operation of the fuel cell assembly and/or gas turbine engine by utilizing the output products to facilitate the generation of a hydrogen rich gas for the fuel cell assembly and/or gas turbine engine.

Notably, however, it will be appreciated that the method 700 is provided by way of example only, and that in other exemplary aspects, the method 700 may include any other additional or alternative aspects.

Further aspects are provided by the subject matter of the following clauses:

A gas turbine engine comprising: a turbomachine having a compressor section, a combustor, and a turbine section arranged in serial flow order, the turbomachine further comprising an outer casing; and a fuel cell assembly positioned within the outer casing of the turbomachine, the fuel cell assembly comprising a fuel cell positioned aft of the combustor of the turbomachine, defining an exhaust in fluid communication with a location forward of the fuel cell to provide output products to the location, or both.

The gas turbine engine of the preceding clause, wherein the fuel cell is positioned aft of the combustor of the turbomachine.

The gas turbine engine of any preceding clause, wherein the turbomachine further comprises an exhaust nozzle located downstream of the turbine section defining a primary exhaust gas flowpath, wherein the fuel cell is positioned inward of the primary exhaust gas flowpath along a radial direction of the gas turbine engine.

The gas turbine engine of any preceding clause, further comprising: an electric machine, wherein the fuel cell and the electric machine are positioned inward of at least a portion of a working gas flowpath of the turbomachine along a radial direction of the gas turbine engine.

The gas turbine engine of any preceding clause, wherein the fuel cell is in electric communication with the electric machine.

The gas turbine engine of any preceding clause, wherein the turbomachine further comprises an exhaust nozzle located downstream of the turbine section defining a primary exhaust gas flowpath, wherein the fuel cell is positioned outward of the primary exhaust gas flowpath along a radial direction of the gas turbine engine.

The gas turbine engine of any preceding clause, wherein the turbomachine comprises an exhaust gas flow from the turbine section during operation of the gas turbine engine, wherein the fuel cell is positioned to receive a portion of the exhaust gas flow.

The gas turbine engine of any preceding clause, wherein the gas turbine engine defines a bypass airflow passage over the turbomachine, and wherein the fuel cell is in selective thermal communication with the bypass airflow passage.

The gas turbine engine of any preceding clause, wherein the exhaust is in fluid communication with the location forward of the fuel cell to provide the output products to the location.

The gas turbine engine of any preceding clause, wherein the exhaust is configured to provide output products to the location forward of the fuel cell, wherein the exhaust is an anode exhaust.

The gas turbine engine of any preceding clause, wherein the turbomachine defines a working gas flowpath, and wherein the exhaust is in fluid communication with the working gas flowpath at the location.

The gas turbine engine of any preceding clause, wherein the location is the combustor, and wherein the exhaust is in fluid communication with the combustor.

The gas turbine engine of any preceding clause, further comprising: a fuel delivery line, wherein the fuel cell assembly comprises a fuel processing unit, wherein the fuel processing unit is in thermal communication with the output products from the fuel cell to convert a fuel flow to a hydrogen rich gas, and wherein the fuel processing unit is in flow communication with the fuel delivery line for providing the hydrogen rich gas to the fuel delivery line.

The gas turbine engine of any preceding clause, further comprising: a fuel delivery line in fluid communication with the combustor, wherein the turbomachine further comprises a combustion section having the combustor, wherein the combustion section of the turbomachine further comprises a primary fuel nozzle integrated into the combustor, and wherein the fuel delivery line is in fluid communication with the primary fuel nozzle.

The gas turbine engine of any preceding clause, wherein the output products comprise unspent fuel from the fuel cell.

The gas turbine engine of any preceding clause, wherein the location is the turbine section, and wherein the exhaust is in fluid communication with the turbine section.

The gas turbine engine of any preceding clause, wherein the location is the compressor section, and wherein the exhaust is in thermal communication with the compressor section.

The gas turbine engine of any preceding clause, wherein the gas turbine engine further comprises a rotor assembly, wherein the location is the rotor assembly, and wherein exhaust is in thermal communication with the rotor assembly.

The gas turbine engine of any preceding clause, further comprising: a fuel delivery line in fluid communication with the combustor; and a thermal bus assembly comprising a heat source exchanger, a heat sink exchanger and a thermal bus in fluid communication with the heat source exchanger and the heat sink exchanger, wherein the heat source exchanger is in thermal communication with the output products, and wherein the heat sink exchanger is in thermal communication with the fuel delivery line.

The gas turbine engine of any preceding clause, wherein the heat source exchanger is positioned to receive substantially exclusively a flow from the fuel cell assembly.

A gas turbine engine comprising: a turbomachine having a compressor section, a combustor, and a turbine section arranged in serial flow order, the turbomachine further comprising an outer casing and, during operation of the gas turbine engine, an exhaust gas flow from the turbine section; and a fuel cell assembly positioned within the outer casing of the turbomachine, the fuel cell assembly comprising a fuel cell defining an inlet positioned to receive a portion of the exhaust gas flow, an outlet positioned to provide output products directly to the exhaust gas flow, or both.

The gas turbine engine of any preceding clause, wherein the fuel cell defines the outlet positioned to provide output products directly to the exhaust gas flow.

The gas turbine engine of any preceding clause, wherein the fuel cell is configured to provide substantially all of the output products directly to the exhaust gas flow during operation of the fuel cell.

The gas turbine engine of any preceding clause, wherein the fuel cell is a first fuel cell of a plurality of fuel cells of the fuel cell assembly, wherein the plurality of fuel cells further comprises a second fuel cell in series flow communication with the first fuel cell at a location downstream of the first fuel cell.

The gas turbine engine of any preceding clause, wherein an anode inlet of the second fuel cell is in fluid communication with an anode outlet of the first fuel cell for receiving output products from the anode of the first fuel cell, and wherein an anode outlet of the second fuel cell is in fluid communication with the exhaust gas flow through the exhaust nozzle of the turbomachine.

The gas turbine engine of any preceding clause, wherein the first fuel cell and the second fuel cell define varying geometries.

The gas turbine engine of any preceding clause wherein the second fuel cell is smaller than the first fuel cell.

The gas turbine engine of any preceding clause, wherein the first fuel cell comprises an electrolyte defining a first porosity, wherein the second fuel cell comprises an electrolyte defining a second porosity, and wherein the second porosity is greater than the first porosity.

The gas turbine engine of any preceding clause, wherein the fuel cell assembly comprises a reformer downstream of the outlet and upstream of the exhaust gas flow.

The gas turbine engine of any preceding clause, wherein the reformer is configured to reduce a fuel composition of a flow to less than a predetermined threshold.

The gas turbine engine of any preceding clause, further comprising: a heat source exchanger located downstream of the reformer.

The gas turbine engine of any preceding clause, wherein the fuel cell defines the inlet positioned to receive the portion of the exhaust gas flow.

The gas turbine engine of any preceding clause, wherein the turbomachine further comprises an exhaust nozzle defining a primary exhaust gas flowpath, wherein the fuel cell is in fluid communication with the primary exhaust gas flowpath for receiving the portion of the exhaust gas flow through the primary exhaust gas flowpath.

The gas turbine engine of any preceding clause, wherein the fuel cell is configured to receive up to 10% of the exhaust gas flow provided to the exhaust nozzle.

The gas turbine engine of any preceding clause, wherein the fuel cell comprises a cathode, and wherein the cathode is positioned to receive the portion of the exhaust gas flow.

The gas turbine engine of any preceding clause, wherein the fuel cell defines a cathode exhaust, and wherein the cathode exhaust is positioned to provide output products from the cathode to the exhaust gas flow.

The gas turbine engine of any preceding clause, wherein the turbomachine further comprises an exhaust nozzle defining a primary exhaust gas flowpath, wherein the turbomachine defines a fuel cell flowpath in parallel with the primary exhaust gas flowpath, wherein the fuel cell is in fluid communication with the fuel cell flowpath.

The gas turbine engine of any preceding clause, wherein the turbomachine comprises an exhaust nozzle, wherein the fuel cell is in thermal communication with an exhaust gas flow through the exhaust nozzle during operation of the gas turbine engine, and wherein the fuel cell is pressurized relative to the exhaust gas flow through the exhaust nozzle during operation of the gas turbine engine.

The gas turbine engine of any preceding clause, wherein the fuel cell assembly comprises a pressure vessel, and wherein the fuel cell is positioned within the pressure vessel.

The gas turbine engine of any preceding clause, wherein the compressor section comprises a high pressure compressor, and wherein the fuel cell comprises a cathode in fluid communication with the high pressure compressor.

The gas turbine engine of any preceding clause, wherein the fuel cell comprises a redox-stable anode.

The gas turbine engine of any preceding clause, wherein the fuel cell defines a maximum power output that is less than or equal to 3% of a maximum power output of the gas turbine engine.

The gas turbine engine of any preceding clause, wherein the fuel cell assembly comprises a fuel processing unit located upstream of the fuel cell.

A method of operating a gas turbine engine having a fuel cell assembly, the method comprising: receiving with a cathode of a fuel cell of the fuel cell assembly a portion of an exhaust gas flow through an exhaust nozzle of a turbomachine of the gas turbine engine.

The method of any preceding clause, wherein receiving the portion of the exhaust gas flow comprises receiving less than 10% of the exhaust gas flow through the exhaust nozzle.

A method of operating a gas turbine engine having a fuel cell assembly, the method comprising: providing, from a fuel cell of the fuel cell assembly, output products directly to an exhaust gas flow through an exhaust nozzle of a turbomachine of the gas turbine engine.

The method of any preceding clause, wherein providing the output products directly to the exhaust gas flow comprises reducing a hydrogen gas content of the output products to less than a predetermined threshold using a reformer positioned downstream of the fuel cell and upstream of the exhaust nozzle.

A gas turbine engine comprising: a turbomachine having a compressor section, a combustor, and a turbine section arranged in serial flow order, the turbomachine further comprising an outer casing; and a fuel cell assembly positioned within the outer casing of the turbomachine, the fuel cell assembly comprising a fuel cell, an inlet line in fluid communication with an inlet of the fuel cell, and an output products line in fluid communication with an outlet of the fuel cell for receiving output products from the fuel cell, wherein the inlet line is positioned to be in thermal communication with the output products during operation of the gas turbine engine.

The gas turbine engine of any preceding clause, wherein the fuel cell assembly comprises a reformer in fluid communication with the output products line.

The gas turbine engine of any preceding clause, wherein the inlet line is in thermal communication with the reformer.

The gas turbine engine of any preceding clause, wherein the inlet line is a fuel line, and wherein the reformer is configured to vaporize a fuel flow through the fuel line.

The gas turbine engine of any preceding clause, wherein the inlet line is a fuel line, and wherein the fuel cell assembly comprises a fuel control valve in fluid communication with the fuel line at a location upstream of the reformer.

The gas turbine engine of any preceding clause, wherein the fuel cell assembly comprises a recirculation line extending from a location downstream of the reformer to the fuel cell for providing a flow from the reformer to the fuel cell.

The gas turbine engine of any preceding clause, wherein the recirculation line extends from the location downstream of the reformer to a cathode inlet line in fluid communication with a cathode of the fuel cell.

The gas turbine engine of any preceding clause, wherein the reformer comprises a reactor configured as a tail gas oxidizer.

The gas turbine engine of any preceding clause, wherein the reformer comprises a first stage and a second stage, wherein the first stage of the reformer is in thermal communication with the fuel line, and wherein the second stage of the reformer is configured reduce a hydrogen gas content of the output products.

The gas turbine engine of any preceding clause, wherein the second stage of the reformer is a reactor configured as a tail gas oxidizer.

A fuel cell assembly for a gas turbine engine, the fuel cell assembly comprising: a fuel cell defining an inlet and an outlet; an inlet line in fluid communication with the inlet of the fuel cell; and an output products line in fluid communication with the outlet of the fuel cell for receiving output products from the fuel cell, wherein the inlet line is positioned to be in thermal communication with the output products during operation of the fuel cell assembly.

The fuel cell assembly of any preceding clause, further comprising: a reformer in fluid communication with the output products line.

The fuel cell assembly of any preceding clause, wherein the inlet line is in thermal communication with the reformer.

The fuel cell assembly of any preceding clause, wherein the inlet line is a fuel line, and wherein the fuel cell assembly further comprises: a fuel control valve in fluid communication with the fuel line at a location upstream of the reformer.

The fuel cell assembly of any preceding clause, further comprising: a recirculation line extending from a location downstream of the reformer to the fuel cell for providing a flow from the reformer to the fuel cell.

A method of operating a gas turbine engine, comprising: generating electric power with a fuel cell positioned within an outer casing of a turbomachine of the gas turbine engine; and transferring heat from output products of the fuel cell to a fuel flow provided to the fuel cell, to an airflow provided to the fuel cell, or both.

The method of any preceding clause, further comprising: transferring heat from output products of the fuel cell to an air flow provided to the fuel cell.

The method of any preceding clause, wherein transferring heat from output products of the fuel cell to the air flow provided to the fuel cell comprises recirculating output products to the fuel cell.

The method of any preceding clause, wherein recirculating output products to the fuel cell comprises modulating an amount of output products recirculated to control a temperature parameter of the fuel cell.

The method of any preceding clause, further comprising: reducing a hydrogen gas composition of the output products with a reformer, and wherein recirculating output products to the fuel cell comprises recirculating output products to the fuel cell from a location downstream of the reformer.

A gas turbine engine assembly comprising: a turbomachine having a compressor section, a combustor, and a turbine section arranged in serial flow order, the turbomachine further comprising an outer casing; and a fuel cell assembly positioned within the outer casing of the turbomachine, the fuel cell assembly comprising a fuel cell and an output products line in fluid communication with an outlet of the fuel cell for receiving output products from the fuel cell; a fuel delivery assembly comprising a fuel line; and a reformer in communication with the fuel line and the output products from the fuel cell during operation of the gas turbine engine to convert a fuel flow through the fuel line to a hydrogen rich gas.

The gas turbine engine assembly of any preceding clause, wherein the reformer is in fluid communication with the fuel line for converting the fuel flow through the fuel line to the hydrogen rich gas.

The gas turbine engine assembly of any preceding clause, wherein the reformer is a steam reformer.

The gas turbine engine assembly of any preceding clause, wherein the reformer is a catalytic partial oxidation reformer.

The gas turbine engine assembly of any preceding clause, wherein the fuel line is in fluid communication with the fuel cell at a location downstream of the reformer.

The gas turbine engine assembly of any preceding clause, wherein the fuel line is in fluid communication with the combustor downstream of the reformer.

The gas turbine engine assembly of any preceding clause, further comprising: a heat source exchanger positioned downstream of the reformer.

The gas turbine engine assembly of any preceding clause, wherein the heat source exchanger is positioned to receive substantially exclusively a flow from the reformer.

The gas turbine engine assembly of any preceding clause, wherein the turbomachine comprises an exhaust nozzle downstream of the turbine section defining a primary exhaust gas flow, wherein the reformer is positioned to provide output products from a cathode of the fuel cell directly to the primary exhaust gas flow.

The gas turbine engine assembly of any preceding clause, wherein the reformer comprises a first stage and a second stage.

The gas turbine engine assembly of any preceding clause 0, wherein the first stage of the reformer comprises a heat exchanger thermally coupling the output products from the fuel cell with the fuel flow through the fuel line.

The gas turbine engine assembly of any preceding clause, wherein the heat exchanger is operable to increase a temperature of the fuel flow through the fuel line to at least 700 degrees Celsius.

The gas turbine engine assembly of any preceding clause, wherein the second stage of the reformer comprises a reactor configured to convert the fuel flow through the fuel line to the hydrogen rich gas.

The gas turbine engine assembly of any preceding clause, wherein the reactor is configured as a tail gas oxidizer.

A fuel cell assembly for a gas turbine engine having a turbomachine, the fuel cell assembly configured to be positioned within an outer casing of the turbomachine and comprising: a fuel cell; an output products line in fluid communication with an outlet of the fuel cell for receiving output products from the fuel cell; a fuel line; and a reformer in communication with the fuel line and the output products from the fuel cell during operation of the gas turbine engine to convert a fuel flow through the fuel line to a hydrogen rich gas.

A method of operating a fuel cell assembly, the method comprising: generating output products with a fuel cell of the fuel cell assembly; receiving a fuel flow through a fuel line with a reformer; and converting the fuel flow through the fuel line received with the reformer to a hydrogen rich gas using at least in part the output products generated with the fuel cell.

The method of any preceding clause, further comprising: providing the hydrogen rich gas to a combustion section of a turbomachine of a gas turbine engine.

The method of any preceding clause, wherein the fuel cell is located within an outer casing of a turbomachine of a gas turbine engine.

The method of any preceding clause, wherein the reformer comprises a reactor in communication with the output products from the fuel cell and the fuel flow, and wherein converting the fuel flow through the fuel line received with the reformer to the hydrogen rich gas comprises converting the fuel flow through the fuel line received with the reformer to the hydrogen rich gas with the reactor.

The method of any preceding clause, wherein the reformer is a steam reformer or a catalytic partial oxidation reformer.

The gas turbine engine assembly of any preceding clause, further comprising an electric line in communication with an electric bus, wherein the fuel cell includes a fuel cell power output that is in electric communication with the electric line, wherein the fuel cell power output and the electric line connect to the electric bus at a location inward of the working gas flowpath along the radial direction and extend through an interior of a first portion of a thermal bus, enclosed by the first portion of the thermal bus.

The gas turbine engine assembly of any preceding clause, wherein the electric bus exits from the interior of the first portion of the thermal bus at a location outward of the working gas flowpath along the radial direction R.

The gas turbine engine assembly of any preceding clause, including a controller having one or more processors and memory, the memory storing instructions that when executed cause the processors to perform operations, the operations including one or more aspects of a method of any preceding clause.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine comprising:
a turbomachine having a compressor section, a combustor, and a turbine section arranged in serial flow order, the turbomachine further comprising an outer casing and, during operation of the gas turbine engine, an exhaust gas flow from the turbine section; and
a fuel cell assembly positioned within the outer casing of the turbomachine, the fuel cell assembly comprising a fuel cell defining an inlet positioned to receive a portion of the exhaust gas flow, an outlet positioned to provide output products directly to the exhaust gas flow, or both, wherein the fuel cell defines the outlet positioned to provide output products directly to the exhaust gas flow, wherein the fuel cell is a first fuel cell of a plurality of fuel cells of the fuel cell assembly, wherein the plurality of fuel cells further comprises a second fuel cell in series flow communication with the first fuel cell at a location downstream of the first fuel cell and wherein the first fuel cell and the second fuel cell define varying geometries.

2. The gas turbine engine of claim 1, wherein the fuel cell defines the inlet positioned to receive the portion of the exhaust gas flow.

3. The gas turbine engine of claim 2, wherein the turbomachine further comprises an exhaust nozzle defining a primary exhaust gas flowpath, wherein the fuel cell is in fluid communication with the primary exhaust gas flowpath for receiving the portion of the exhaust gas flow through the primary exhaust gas flowpath.

4. The gas turbine engine of claim 3, wherein the fuel cell is configured to receive up to 10% of the exhaust gas flow provided to the exhaust nozzle.

5. The gas turbine engine of claim 2, wherein the fuel cell comprises a cathode, and wherein the cathode is positioned to receive the portion of the exhaust gas flow.

6. The gas turbine engine of claim 2, wherein the turbomachine further comprises an exhaust nozzle defining a primary exhaust gas flowpath, wherein the turbomachine defines a fuel cell flowpath in parallel with the primary exhaust gas flowpath, wherein the fuel cell is in fluid communication with the fuel cell flowpath.

7. The gas turbine engine of claim 1, wherein the turbomachine comprises an exhaust nozzle, wherein the fuel cell is in thermal communication with an exhaust gas flow through the exhaust nozzle during operation of the gas turbine engine, and wherein the fuel cell is pressurized relative to the exhaust gas flow through the exhaust nozzle during operation of the gas turbine engine.

8. The gas turbine engine of claim 1, wherein the fuel cell comprises a redox-stable anode.

9. The gas turbine engine of claim 1, wherein the fuel cell defines a maximum power output that is less than or equal to 3% of a maximum power output of the gas turbine engine.

10. The gas turbine engine of claim 1, wherein the fuel cell is configured to provide substantially all of the output products directly to the exhaust gas flow during operation of the fuel cell.

11. The gas turbine engine of claim 1, wherein the second fuel cell is smaller than the first fuel cell.

12. The gas turbine engine of claim 1, wherein the first fuel cell comprises an electrolyte defining a first porosity, wherein the second fuel cell comprises an electrolyte defining a second porosity, and wherein the second porosity is greater than the first porosity.

13. The gas turbine engine of claim 1, wherein the fuel cell assembly comprises a reformer downstream of the outlet and upstream of the exhaust gas flow.

14. The gas turbine engine of claim 13, wherein the reformer is configured to reduce a fuel composition of a flow to less than a predetermined threshold.

15. The gas turbine engine of claim 13, further comprising:
a heat source exchanger located downstream of the reformer.

16. A method of operating a gas turbine engine having a fuel cell assembly, the method comprising:
receiving with a cathode of a fuel cell of the fuel cell assembly a portion of an exhaust gas flow through an exhaust nozzle of a turbomachine of the gas turbine engine;
providing, from a fuel cell of the fuel cell assembly, output products directly to an exhaust gas flow through an exhaust nozzle of a turbomachine of the gas turbine engine, wherein the fuel cell assembly comprises a reformer downstream of the outlet and upstream of the exhaust gas flow; and
reducing a fuel composition of a flow to less than a predetermined threshold via the reformer.

17. A gas turbine engine comprising:
a turbomachine having a compressor section, a combustor, and a turbine section arranged in serial flow order, the turbomachine further comprising an outer casing and, during operation of the gas turbine engine, an exhaust gas flow from the turbine section; and
a fuel cell assembly positioned within the outer casing of the turbomachine, the fuel cell assembly comprising a fuel cell defining an inlet positioned to receive a portion of the exhaust gas flow, an outlet positioned to provide output products directly to the exhaust gas flow, or both, wherein the fuel cell defines the outlet positioned to provide output products directly to the exhaust gas flow, wherein the fuel cell is a first fuel cell of a plurality of fuel cells of the fuel cell assembly, wherein the fuel cell assembly comprises a reformer downstream of the outlet and upstream of the exhaust gas flow, and wherein the reformer is configured to reduce a fuel composition of a flow to less than a predetermined threshold.

18. The gas turbine engine of claim 17, further comprising a heat source exchanger located downstream of the reformer.

19. The gas turbine engine of claim 17, wherein the fuel cell defines the inlet positioned to receive the portion of the exhaust gas flow, wherein the turbomachine further comprises an exhaust nozzle defining a primary exhaust gas flowpath, wherein the fuel cell is in fluid communication with the primary exhaust gas flowpath for receiving the portion of the exhaust gas flow through the primary exhaust gas flowpath.

20. The gas turbine engine of claim 17, wherein the turbomachine comprises an exhaust nozzle, wherein the fuel cell is in thermal communication with an exhaust gas flow through the exhaust nozzle during operation of the gas turbine engine, and wherein the fuel cell is pressurized relative to the exhaust gas flow through the exhaust nozzle during operation of the gas turbine engine.

\* \* \* \* \*